(12) United States Patent
Mazzoccoli et al.

(10) Patent No.: US 12,059,668 B2
(45) Date of Patent: Aug. 13, 2024

(54) COPPER, IRON, AND NITROGEN TREATED SORBENT AND METHOD FOR MAKING SAME

(71) Applicant: CALGON CARBON CORPORATION, Moon Township, PA (US)

(72) Inventors: Jason P. Mazzoccoli, Pittsburgh, PA (US); Ryan W. Walker, Pittsburgh, PA (US); Walter G. Tramposch, Moon Township, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 26 days.

(21) Appl. No.: 17/446,555

(22) Filed: Aug. 31, 2021

(65) Prior Publication Data
US 2022/0062861 A1  Mar. 3, 2022

Related U.S. Application Data

(60) Provisional application No. 63/072,544, filed on Aug. 31, 2020.

(51) Int. Cl.
*B01J 20/30* (2006.01)
*B01J 20/02* (2006.01)
(Continued)

(52) U.S. Cl.
CPC ....... *B01J 20/3085* (2013.01); *B01J 20/0229* (2013.01); *B01J 20/0237* (2013.01);
(Continued)

(58) Field of Classification Search
CPC ............... B01J 20/3085; B01J 20/0229; B01J 20/0237; B01J 20/0259; B01J 20/20;
(Continued)

(56) References Cited

U.S. PATENT DOCUMENTS 2,038,071 A   4/1936  Wilhelm
3,713,281 A   1/1973  Asker et al.
(Continued)

FOREIGN PATENT DOCUMENTS

CA      2485103 A1    11/2003
CN    108940191 A     12/2018
(Continued)

OTHER PUBLICATIONS

Barrios-Bermudez et al. Nanomaterials 2020, 10, 749 (Published Apr. 14, 2020) (Year: 2020).*
(Continued)

*Primary Examiner* — Samir Shah
*Assistant Examiner* — Jordan W Taylor
(74) *Attorney, Agent, or Firm* — DLA Piper LLP (US)

(57) ABSTRACT

Carbonaceous material that is activated to form precursor activated carbon is further enhanced by doping with copper, iron, and nitrogen and calcining. The carbonaceous material includes those obtained from coal, wood, or coconut shells. Methods of doping the activated carbon are described. The described treatment processes result in a sorbent material that has excellent performance in removing chloramine and similar compounds from fluids such as water that is intended for drinking.

23 Claims, 10 Drawing Sheets

(51) Int. Cl.
*B01J 20/20* (2006.01)
*C02F 1/28* (2023.01)
*C02F 101/12* (2006.01)
*C02F 101/16* (2006.01)

(52) U.S. Cl.
CPC .......... *B01J 20/0259* (2013.01); *B01J 20/20* (2013.01); *B01J 20/3078* (2013.01); *C02F 1/283* (2013.01); *B01J 2220/4806* (2013.01); *B01J 2220/4825* (2013.01); *B01J 2220/4881* (2013.01); *C02F 2101/12* (2013.01); *C02F 2101/16* (2013.01); *C02F 2303/04* (2013.01)

(58) Field of Classification Search
CPC ............ B01J 20/3078; B01J 2220/4806; B01J 2220/4825; B01J 2220/4881; B01J 2220/42; C02F 1/283; C02F 2101/12; C02F 2101/16; C02F 2303/04; C02F 2303/185
See application file for complete search history.

(56) References Cited

U.S. PATENT DOCUMENTS

| | | |
|---|---|---|
| 3,757,488 A | 9/1973 | Austin et al. |
| 4,331,639 A | 5/1982 | Hass et al. |
| 4,624,937 A | 11/1986 | Chou |
| 4,921,826 A | 5/1990 | Juntgen et al. |
| 5,016,628 A | 5/1991 | Lambert |
| 5,248,395 A | 9/1993 | Rastelli et al. |
| 5,322,778 A | 6/1994 | Antrim et al. |
| 5,338,458 A | 8/1994 | Carrubba et al. |
| 5,348,755 A | 9/1994 | Roy |
| 5,352,274 A | 10/1994 | Blakley |
| 5,356,849 A | 10/1994 | Matviya et al. |
| 5,500,038 A | 3/1996 | Dauber et al. |
| 5,504,050 A | 4/1996 | Hayden |
| 5,598,721 A | 2/1997 | Rockenfeller et al. |
| 5,754,002 A | 5/1998 | Haitko et al. |
| 5,821,682 A | 10/1998 | Foust et al. |
| 5,861,050 A | 1/1999 | Pittel et al. |
| 6,176,897 B1 | 1/2001 | Keefer |
| 6,186,939 B1 | 2/2001 | Forrester |
| 6,342,129 B1 | 1/2002 | Vaughn et al. |
| 6,406,523 B1 | 6/2002 | Connor et al. |
| 6,599,856 B1 | 7/2003 | Uchino et al. |
| 6,699,393 B2 | 3/2004 | Baker et al. |
| 6,706,194 B2 | 3/2004 | Baker et al. |
| 6,848,374 B2 | 2/2005 | Srinivasachar et al. |
| RE38,844 E | 10/2005 | Hiltzik et al. |
| 7,077,891 B2 | 7/2006 | Jaffe et al. |
| 7,222,612 B2 | 5/2007 | Hagler et al. |
| 7,278,406 B2 | 10/2007 | Hagler |
| 7,361,280 B2 | 4/2008 | Baker |
| 7,547,350 B2 | 6/2009 | Callahan et al. |
| 7,666,507 B2 | 2/2010 | Ishikawa et al. |
| 7,704,305 B2 | 4/2010 | Nishida |
| 7,780,765 B2 | 8/2010 | Srinivasachar et al. |
| 7,858,061 B2 | 12/2010 | Varma et al. |
| 7,862,725 B2 | 1/2011 | Mazyck et al. |
| 7,879,136 B2 | 2/2011 | Mazyck |
| 7,923,410 B2 | 4/2011 | Turk et al. |
| 8,034,163 B1 | 10/2011 | Durham et al. |
| 8,042,524 B2 | 10/2011 | Elum et al. |
| 8,057,576 B2 | 11/2011 | Pollack |
| 8,069,797 B2 | 12/2011 | Srinivasachar et al. |
| 8,080,088 B1 | 12/2011 | Srinivasachar |
| 8,168,147 B2 | 5/2012 | Olson et al. |
| 8,263,524 B1 | 9/2012 | Skandan et al. |
| 8,864,877 B2 | 10/2014 | Nishita et al. |
| 9,120,079 B1 | 9/2015 | Dietz et al. |
| 9,174,205 B2 | 11/2015 | Reimerink-Schats et al. |
| 9,732,649 B2 | 8/2017 | Hiltzik et al. |
| 10,155,673 B2 | 12/2018 | Stouffer et al. |
| 10,702,853 B2 | 7/2020 | Mazzoccoli et al. |
| 11,872,539 B2 | 1/2024 | Mazzoccoli et al. |
| 11,911,743 B2 | 2/2024 | DiStefano et al. |
| 2002/0170436 A1 | 11/2002 | Keefer et al. |
| 2003/0188663 A1 | 10/2003 | Barthel et al. |
| 2004/0118287 A1 | 6/2004 | Jaffe et al. |
| 2004/0118387 A1 | 6/2004 | Lawrence |
| 2005/0081717 A1 | 4/2005 | Meiller et al. |
| 2005/0150835 A1* | 7/2005 | Vo .......... B01D 53/64 210/660 |
| 2005/0167367 A1 | 8/2005 | Baker |
| 2006/0042467 A1 | 3/2006 | Maru |
| 2006/0054142 A1 | 3/2006 | Burke et al. |
| 2007/0169758 A1 | 7/2007 | Mills |
| 2007/0272080 A1 | 11/2007 | Allen et al. |
| 2008/0073290 A1 | 3/2008 | Ryan et al. |
| 2008/0121141 A1 | 5/2008 | Comrie et al. |
| 2008/0283446 A1 | 11/2008 | Tatarchuk et al. |
| 2008/0308075 A1 | 12/2008 | Allen et al. |
| 2009/0172998 A1 | 7/2009 | Harris et al. |
| 2009/0223370 A1 | 9/2009 | Kosugi et al. |
| 2010/0178624 A1 | 7/2010 | Srinivasachar |
| 2011/0030592 A1 | 2/2011 | Baldrey et al. |
| 2011/0076210 A1 | 3/2011 | Pollack et al. |
| 2012/0048110 A1 | 3/2012 | Dawes et al. |
| 2012/0100054 A1 | 4/2012 | Durham et al. |
| 2012/0172216 A1 | 7/2012 | Bohringer et al. |
| 2012/0220451 A1 | 8/2012 | Miyata et al. |
| 2013/0078169 A1 | 3/2013 | LaFlesh et al. |
| 2013/0109562 A1 | 5/2013 | Wong et al. |
| 2013/0168321 A1 | 7/2013 | Cannon et al. |
| 2013/0269532 A1 | 10/2013 | Kimoto |
| 2013/0316433 A1 | 11/2013 | Huang |
| 2014/0112856 A1 | 4/2014 | Krutka et al. |
| 2014/0117054 A1 | 5/2014 | Ryan et al. |
| 2014/0165542 A1 | 6/2014 | Loftin et al. |
| 2014/0336568 A1 | 11/2014 | Wong |
| 2015/0050202 A1 | 2/2015 | Filippelli et al. |
| 2016/0023920 A1 | 1/2016 | Doyle et al. |
| 2016/0102019 A1 | 4/2016 | Pollack et al. |
| 2016/0166972 A1 | 6/2016 | Owens et al. |
| 2016/0167982 A1* | 6/2016 | Stouffer .......... B01J 20/3078 210/287 |
| 2016/0236169 A1 | 8/2016 | Doughty et al. |
| 2016/0271555 A1 | 9/2016 | Hiltzik et al. |
| 2016/0346723 A1 | 12/2016 | Honore et al. |
| 2017/0297926 A1 | 10/2017 | Nickelsen et al. |
| 2018/0030871 A1 | 2/2018 | Hiltzik et al. |
| 2018/0214816 A1 | 8/2018 | Greenbank |
| 2018/0229217 A1* | 8/2018 | Mazzoccoli .......... C02F 1/283 |
| 2019/0201870 A1 | 7/2019 | Kumar Pal et al. |
| 2019/0247831 A1 | 8/2019 | Tramposch et al. |
| 2019/0270081 A1 | 9/2019 | Ilinich et al. |
| 2020/0038798 A1 | 2/2020 | Greenbank et al. |
| 2020/0039809 A1 | 2/2020 | Greenbank et al. |
| 2020/0040851 A1 | 2/2020 | Greenbank et al. |
| 2020/0179902 A1 | 6/2020 | Huang |
| 2020/0316560 A1 | 10/2020 | Distefano et al. |

FOREIGN PATENT DOCUMENTS

| | | |
|---|---|---|
| DE | 3620425 C1 | 6/1987 |
| EP | 0433677 A1 | 6/1991 |
| EP | 1413348 A1 | 4/2004 |
| EP | 1521723 B2 | 4/2005 |
| FR | 3077069 A1 | 7/2019 |
| GB | 1336241 A | 11/1973 |
| JP | H-01058331 B2 | 3/1989 |
| JP | 2008023365 A | 2/2008 |
| KR | 20120074080 A | 7/2012 |
| WO | 198100399 A1 | 2/1981 |
| WO | 2009031562 A1 | 3/2009 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013096281 A1 | 6/2013 |
| WO | 2013149241 A1 | 10/2013 |
| WO | 2014082076 A1 | 5/2014 |
| WO | 2014088630 A1 | 6/2014 |

(56) References Cited

FOREIGN PATENT DOCUMENTS

| WO | 2014205200 A1 | 12/2014 |
| WO | 2016185033 A1 | 11/2016 |
| WO | 2017180346 A1 | 10/2017 |
| WO | 2018116842 A1 | 6/2018 |
| WO | 2018144588 A1 | 8/2018 |
| WO | 2018175936 A1 | 9/2018 |
| WO | 2020028703 A2 | 2/2020 |
| WO | 2020028839 A1 | 2/2020 |
| WO | 2020028845 A1 | 2/2020 |

OTHER PUBLICATIONS

Pietrzak et al. Energy & Fuels 2006, 20, 1275-1280 (Year: 2006).*

Zhang et al. Water Research 2013, 47, 4022-4031 (Year: 2013).*

Appleman et al., "Treatment of poly-and perfluoroalkyl substances in U.S. full-scale water treatment systems", Water Research, vol. 51 pp. 246-255 (2014).

"The Chemistry of Nitrogen and Phosphorous." Purdue Chemistry, Purdue University, (2006) chemed.chem.purdue.edu/genchem/topicreview/bp/ch10/group5.php#negative.

Johnson et al., "Advanced Filtration Membranes for the Removal of Perfluoroalkyl Species from Water", American Chemical Society, ACS Omega, May 2, 2019, vol. 4(5), pp. 8001-8006.

McNamara et al., "Comparison of Activated Carbons for Removal of Perfluorinated Compounds From Drinking Water", Article in Journal AWWA, Jan. 2018; Retrieved from Internet on Sep. 22, 2021. url <https://cswab.org/wp-content/uploads/2018/12/Activated-Carbons-Comparison-for-Removal-of-PFAS-in-Drinking-Water-McNamara-2018.pdf>.

Raposo et al., Mercury Speciation in Fluorescent Lamps by Thermal Release Analysis (2003), Waste Management 23(10):879-886.

Sharifi et al., "Formation of Active Sites for Oxygen Reduction Reactions by Transformation of Nitrogen Functionalities in Nitrogen-Doped Carbon Nanotubes." ACS Nano, vol. 6, No. 10, 2012, pp. 8904-8912, doi:10.1021/nn302906r.

Wang et al., "Influence of cations on the partition behavior of perfluoroheptanoate (PFHpA) and perfluorohexanesulfonate (PFHxS) on waste water sludge", Chemosphere, vol. 131, Jul. 2015, pp. 178-183.

Westreich et al., "The removal of short-chain and long-chain perfluoroalkyl acids and sulfonates via granular activated carbons: a comparative column study", Remediation Journal, Dec. 4, 2018; vol. 29(1) pp. 19-26.

Sontheimer et al. "Evaluation Methods Utilizing Aqueous Solutions, in Activated Carbon For Water Treatment" 1988, DVGW-Forschungsstelle Second Edition 100-105.

Xu et al., "Biomass Based Iron and Nitrogen Co-Doped 3D Porous Carbon as an Efficient Oxygen Reduction Catalyst", Journal of Colloid and Interface Science, Mar. 28, 2018, vol. 523, pp. 144-150.

* cited by examiner

COPPER, IRON, AND NITROGEN TREATED SORBENT AND METHOD FOR MAKING SAME

CROSS-REFERENCE TO RELATED APPLICATIONS

This application claims the benefit of U.S. Provisional Patent Application No. 63/072,544 filed Aug. 31, 2020, the entirety of which is incorporated by reference herein.

FIELD

Fluids such as water are routinely disinfected by adding oxidizing compounds, irradiating the water with ultraviolet radiation, or both. While these techniques are effective at disinfecting the water, the disinfected water will often include the oxidizing compounds themselves, products of the oxidizing compounds as they dissolve in the water, or reaction compounds that result from the irradiation of the water that contains various constituent compounds. Collectively, these various compounds include chlorine, chloramines, chloroform, trihalomethanes, haloacetic acids, organic peroxides, and hydrogen peroxides. These compounds are undesired because they alter the smell and taste of the water, cause health problems, and can cause corrosion of mains and service lines.

To remove these compounds, sorbents have been used. The sorbents absorb and adsorb the various compounds. In particular, the pores of sorbents permit the adsorption of the compounds. However, pure sorbents are inefficient and only adsorb a fraction of the compounds that must be removed. To increase their effectiveness, the sorbents are sometimes treated with compounds to form catalytic sorbent. Catalytic species are usually present on the surface of the sorbent particles and function by catalyzing the chemical decomposition of those undesired compounds that adsorb or absorb poorly on the sorbent. By employing both mechanisms of adsorption and catalysis, a catalytic sorbent is significantly more efficient than a pure, untreated sorbent. Catalytic sorbents have proven effective for removing chlorine, chloramines, chloroform, trihalomethanes, haloacetic acids, organic peroxides, and hydrogen peroxides from water and other fluids. Even so, there remains a continued need to improve the various steps of forming such catalytic sorbents, and thereby improve overall sorbent performance.

SUMMARY

Carbonaceous material that is activated to form precursor activated carbon is further enhanced by doping with iron and copper and nitrogen and calcining. The resultant sorbent material has excellent catalytic properties which are useful in the field of fluid purification.

A sorbent material formed from a carbonaceous material that is activated to form a precursor activated carbon, the sorbent material comprising: about 2 wt. % to about 20 wt. % nitrogen as measured on a dry precursor activated carbon basis; about 0.1 wt. % to about 4 wt. % iron and copper as measured on a dry precursor activated carbon basis; wherein the sorbent material has a chloramine destruction number (CDN) of about 5 to about 75.

In another embodiment, the chloramine destruction number is about 20 to about 75.

In another embodiment, the sorbent material has a peroxide number of less than about 20 minutes.

In another embodiment, the sorbent material has a peroxide number of about 1 minute to about 10 minutes.

In another embodiment, the amount of nitrogen is about 2.5 wt. % to about 5 wt. %.

In another embodiment, the amount of nitrogen is about 1.4 wt. % to about 3.0 wt. %.

In another embodiment, the sorbent material is formed from a carbonaceous material that is formed from one or more of coal, wood, and coconut.

In another embodiment, at least part of the carbonaceous material is formed from coconut.

In another embodiment, the weight ratio of iron and copper is about 25:75 to about 75:25.

In another embodiment, the weight ratio of iron and copper is about 50:50.

In one embodiment there is a method of manufacturing a sorbent material, the method comprising: providing a carbonaceous material; activating the carbonaceous material to form a precursor activated carbon; optionally oxidizing the precursor activated carbon; doping the precursor activated carbon by contacting the precursor activated carbon with one or more compounds that are a copper source, an iron source, and a nitrogen source to thereby form a doped precursor activated carbon; calcining the doped precursor activated carbon by heating to a temperature of at least about 950° C. in a calcining atmosphere that does not cause any substantial oxidation or activation of the doped precursor activated carbon to thereby form a sorbent material.

In another embodiment, a single compound is the copper source, the iron source, and the nitrogen source.

In another embodiment, a first compound is the copper source and the iron source, and a second compound is the nitrogen source.

In another embodiment, a first compound is the copper source and the nitrogen source, and a second compound is the iron source.

In another embodiment, a first compound is the iron source and the nitrogen source, and a second compound is the copper source.

In another embodiment, a first compound is the copper source, a second compound is the iron source, and a third compound is the nitrogen source.

In another embodiment, doping the precursor activated carbon is performed in a single stage process, the single stage process including contacting the precursor activated carbon in an aqueous solution that contains the copper source, the iron source, and the nitrogen source.

In another embodiment, the copper source is one or more of copper(II) sulfate pentahydrate ($CuSO_4 \cdot 5H_2O$), copper (II) chloride ($CuCl_2$), copper(II) chloride dihydrate ($CuCl_2 \cdot 2H_2O$), copper(II) nitrate ($Cu(NO_3)_2$), copper(II) nitrate monohydrate ($Cu(NO_3)_2 \cdot H_2O$), copper(II) nitrate sesquihydrate ($Cu(NO_3)_2 \cdot 1.5H_2O$), copper(II) nitrate hemipentahydrate ($Cu(NO_3)_2 \cdot 2.5H_2O$), copper(II) nitrate trihydrate ($Cu(NO_3)_2 \cdot 3H_2O$), copper(II) nitrate hexahydrate (($[Cu(H_2O)_6](NO_3)_2$)), copper(II) acetate ($Cu(CH_3COO)_2$), copper(II) acetate monohydrate ($Cu(CH_3COO)_2 \cdot H_2O$), Copper (II) formate tetrahydrate, $Cu(NH_3)_6^{+2}$, copper (II) carbonate hydroxide, $Cu_2(OH)_2CO_3$, compounds thereof, or mixtures thereof; the iron source is one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate (($NH_4)_3Fe(C_2O_4)_3 \cdot 3H_2O$), ammonium hexacyanoferrate(II) hydrate (($NH_4)_4[Fe(CN)_6] \cdot xH_2O$), ammonium iron(III) citrate (($NH_4)_5[Fe(C_6H_4O_7)_2]$), sodium ferrocyanide decahydrate ($Na_4Fe(CN)_6 \cdot 10H_2O$), sodium ferrioxalate ($Na_3Fe(C_2O_4)_3$), potassium ferrocyanide trihydrate ($K_4[Fe(CN)_6] \cdot 3H_2O$), potassium ferricyanide ($K_3[Fe(CN)_6]$), potassium ferrooxalate ($K_2[Fe(C_2O_4)_2]$), or iron(II) acetate tetrahydrate (($CH_3COO)_2Fe \cdot 4H_2O$), ferrous lactate dihydrate, ferrous lacate trihydrate, compounds thereof, or mixtures thereof; and the nitrogen source is one or more compounds where nitrogen has a −3 oxidation state.

In another embodiment, calcining is performed at a temperature of about 800° C. to about 1050° C. in a $N_2$ atmosphere.

In another embodiment, the oxidizing is required and is performed.

In another embodiment, the oxidizing is not performed.

In another embodiment, the copper source is copper(II) sulfate pentahydrate ($CuSO_4 \cdot 5H_2O$), the iron source is iron (III) chloride hexahydrate ($FeCl_3 \cdot 6H_2O$), and the nitrogen source is one or more of urea or dicyandiamide (DCN).

In another embodiment, calcining is performed at a temperature of about 400° C. to about 1050° C. in a $N_2$ atmosphere.

In another embodiment, calcining is performed at a temperature of about 925° C. to about 975° C. in a $N_2$ atmosphere.

In another embodiment, there is a method of removing chlorine, chloramine, or both chlorine and chloramine from a fluid, the method comprising: providing a sorbent material, the sorbent material being formed from a carbonaceous material that is activated to form a precursor activated carbon, said sorbent material comprising about 2 wt. % to about 20 wt. % nitrogen as measured on a dry precursor activated carbon basis, about 0.1 wt. % to about 4 wt. % iron and copper as measured on a dry precursor activated carbon basis, and wherein the sorbent material has a chloramine destruction number (CDN) of about 5 to about 75; and contacting the sorbent material with a fluid.

In another embodiment, the fluid is liquid water.

In another embodiment, the water or the sorbent material has previously undergone a disinfecting step.

DRAWINGS

Aspects, features, benefits, and advantages of the embodiments described herein will be apparent with regard to the following description, appended claims, and accompanying drawings, where:

DETAILED DESCRIPTION

Figure 1:
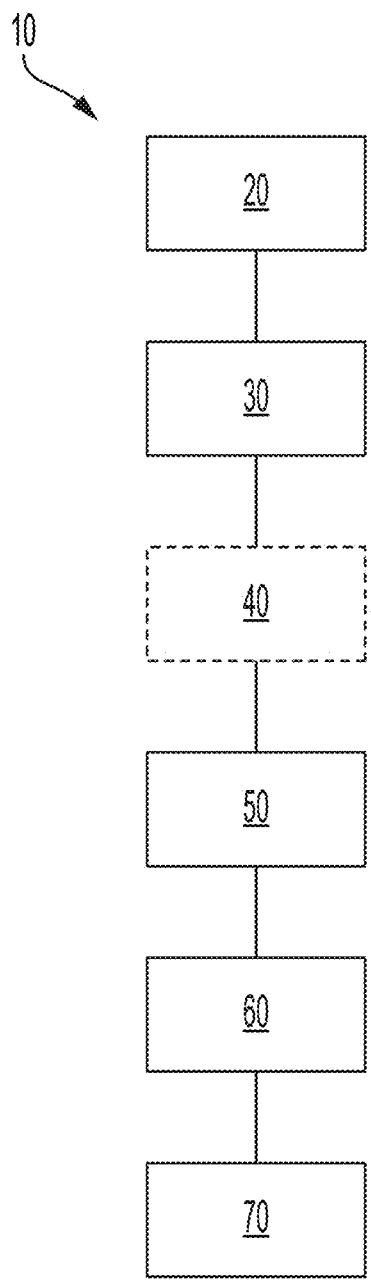
FIG. 1 depicts a process in accordance with an embodiment.

This disclosure is not limited to the particular systems, devices and methods described, as these may vary. The terminology used in the description is for the purpose of describing the particular versions or embodiments only and is not intended to limit the scope of the invention. Furthermore, as described herein, any listing of a patent document such as a U.S. Patent, U.S. Patent Application Publication, World Intellectual Property Organization publication, or foreign patent application publication means that such document is incorporated by reference in its entirety.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. Therefore, about 50% means in the range of 45%-55%.

As used herein, the term "sorbent material" means any material that exhibits adsorbent properties, absorbent properties, or a combination of adsorbent properties and absorbent properties. Adsorbent properties mean that atoms, ions, or molecules physically adhere to the surface of the material. Absorbent properties means that atoms, ions, or molecule enter and are retained by a bulk phase of the material. By way of example, sorbent materials include activated carbon, reactivated carbon, natural and synthetic zeolite, silica, silica gel, alumina, zirconia, and diatomaceous earths. As used herein, "sorbent material" is a material whose constituent components are substantially adsorbent and/or absorbent, with only minimal components that are not adsorbent and/or absorbent (for example, the minimal amount of binder that is required for activated carbon pellets to maintain their shape).

As used herein, the term "sorbent" means any composition or composite that includes a sorbent material in a blend, mixture, composite, or compound with one or more additional materials that do not exhibit adsorbent properties. By way of example, one embodiment of sorbent includes an activated carbon sorbent material mixed with a thermally conductive filler.

As used herein, the term "carbonaceous material" means a material that contains carbon that has not been thermally activated or chemically activated. Carbonaceous material may have been mechanically treated, thermally treated, or chemically treated, and can even have weakly sorbent properties, but carbonaceous material does not adsorb compounds in substantial amounts as would be expected of a material such as activated carbon. Examples of carbonaceous material include but are not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, or polymer fibers.

As used herein, the term "disinfection byproduct" means a compound that is formed as a result of chemical reactions between organic and inorganic matter found in water and the chemical compounds that are used during the disinfection process, or a compound that is formed as a result of the irradiation of organic and inorganic matter found in water by ultraviolet radiation. Examples of disinfection byproducts include one or more of chlorine, chloramines, chloroform, trihalomethanes, haloacetic acids, organic peroxides, and hydrogen peroxides. It should be noted, however, that it is possible for compounds that are disinfection byproducts to be present in water that has not undergone a disinfection process.

As used herein, the term "macropores" means pores within a sorbent that are greater than about 50 nm in diameter.

As used herein, the term "mesopores" means pores within a sorbent that have a diameter of about 2 nm to about 50 nm.

As used herein, the term "micropores" means pores within a sorbent that have a diameter of less than about 2 nm.

As used herein, "chloramine" means one or more of mono-chloramine ($NH_2Cl$), di-chloramine ($NHCl_2$), or tri-chloramine ($NCl_3$).

The sorbents or sorbent materials described herein are useful for removing chloroforms and other similar volatile organic chemical compounds (VOC) from fluids such as water. The VOC are not limited and include one or more of styrene, alachlor, atrazine, benzene, carbofuran, carbon tetrachloride, chlorobenzene, chloropicrin, 2,4-dichlorophenoxyacetic acid (2,4-D), dibromochloropropane (DBCP), o-dichlorobenzene, p-dichlorobenzene, 1,2-dichloroethane, 1,1-dichloroethylene, cis-1,2-dichloroethylene, trans-1,2-dichloroethylene, 1,2-dichloropropane, cis-1,3-dichloropropylene, dinoseb, endrin, ethylbenzene, ethylene dibromide (EDB), haloacetonitriles (HAN) including bromochloroacetonitrile, dibromoacetonitrile, dichloroacetonitrile, and trichloroacetonitrile, haloketones (HK) including 1,1-dichloro-2-propanone and 1,1,1-trichloro-2-propanone, heptachlor (H-34, Heptox), heptachlor epoxide, hexachlorobutadiene, hexachlorocyclopentadiene, lindane, methoxychlor, pentachlorophenol, simazine, styrene, 1,1,2,2-tetrachloroethane, tetrachloroethylene, toluene, 2,4,5-TP (silvex), tribromoacetic acid, 1,2,4-trichlorobenzene, 1,1,1-trichloroethane, 1,1,2-trichloroethane, trichloroethylene, trihalomethanes including chloroform, bromoform, bromodichloromethane, chlorodibromomethane, or xylene. VOC that are relevant in the field of drinking water are known in the industry and are described, for example, in NSF/ANSI 53-2019, which was designated a standard on May 6, 2019 and which is incorporated by reference in its entirety. In some instances, the removal of VOC by sorbents or sorbent materials is measured by the removal of the individual VOC species themselves. In other embodiments, the removal of VOC by sorbents or sorbent materials is measured by the removal of surrogate compounds. Surrogates are compounds that are similar in chemical composition to the analytes of interest and which are present in sample prior to preparation and analysis. For example, chloroform is one example of a surrogate for the compounds of this paragraph.

The sorbents or sorbent materials described herein are also useful for removing other contaminants from water or other fluids such as perfluoroalkyl and polyfluoroalkyl substances (PFAS). The PFAS compounds include one or more of perfluorooctanoic acid (PFOA), perfluorooctanesulfonic acid (PFOS), and compounds produced by the GENX process such as 2,3,3,3,-tetrafluoro-2-(heptafluoropropoxy)propanoate and heptafluoropropyl 1,2,2,2-tetrafluoroethyl ether.

The sorbents or sorbent materials are also useful in removing a wide variety of emerging contaminants from water or other fluids. Such emerging contaminants include one or more of meprobamate, phenytoin, atenolol, carbamazepine, tris(2-chloroethyl) phosphate (TCEP), tris(1-chloro-2-propyl) phosphate (TCPP), N,N-diethyl-meta-toluamide (DEET), metolachlor, trimethoprim, ibuprofen, naproxen, estrone, bisphenol A, linuron, or nonyl phenol.

One embodiment of the overall process 10 of the disclosure is shown in FIG. 1. In FIG. 1, a carbonaceous material is provided 20, followed by activating 30 the carbonaceous material to form a precursor activated carbon. The precursor activated carbon is optionally oxidized 40, which means that in certain embodiments oxidation 40 is performed, but in certain other embodiments oxidation 40 is not performed. After the oxidation 40, the precursor activated carbon is doped 50 which imparts a quantity of copper dopants, iron dopants, and nitrogen dopants to the precursor activated carbon and thereby produce a doped precursor activated carbon. The doped precursor activated carbon is then calcined 60 by heating under at specified temperatures and under a specified atmosphere and cooled 70 in an inert atmosphere so as not to substantially alter the pore structure or cause any substantial oxidation or activation of the doped precursor activated carbon. The completion of calcination 60 and cooling 70 produces the sorbent material of the disclosure.

Carbonaceous Material Processing

The disclosure provides one or more carbonaceous materials that are precursors to the final sorbents. Carbonaceous material may have been mechanically treated, thermally treated, or chemically treated, and can even have weakly sorbent properties, but carbonaceous material does not adsorb compounds in substantial amounts as would be expected of a material such as activated carbon. Additionally, although the carbonaceous materials may have been mechanically treated, thermally treated, or chemically treated, they have not been treated in ways that activate the carbon. Examples of carbonaceous material include but are not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, or polymer fibers.

In certain embodiments, the carbonaceous material is coconut. Coconut carbonaceous materials are particularly useful because when coconut is activated to form activated carbon, it has excellent adsorption of chloroform and other organic compounds.

After the carbonaceous material is provided, it is processed. Certain processing steps are not limited. Those steps that are not limited and depend on the kind of the carbonaceous material and also the desired form of the final activated carbon, and the steps include one or more of pyrolysis of the carbonaceous material to form a charcoal, pulverizing the charcoal, mixing a binder with the pulverized charcoal, briquetting the pulverized charcoal and binder, crushing the briquettes, sizing the crushed briquettes, and baking the sized briquettes or the briquettes themselves to carbonize, cure, or remove the binder. However, in all instances, the carbonaceous material in the form of baked briquettes or sized particles is thermally activated, chemically activated, or thermally and chemically activated. Thermal activation is performed by heating the baked briquettes or sized particles in the presence of one or more of water, oxygen, and carbon dioxide. Chemical activation is performed by impregnating the baked briquettes or sized particles in the presence of a strong acid, strong base, or a salt. It should be noted that whether each of the above steps are included in the processing sometimes depends on the provided carbonaceous material. For example, when the carbonaceous material is coconut, process steps do not include "reagglomeration," which is the steps of mixing a binder with the pulverized charcoal, briquetting the pulverized charcoal and binder, crushing the briquettes, and sizing the crushed briquettes.

The result of processing the carbonaceous material is that activated carbon is formed. As described herein, this activated carbon will be referred to as "precursor activated carbon" as subsequent disclosure describes additional steps that will be applied to the precursor activated carbon to further improve its performance. The performance of the precursor activated carbon depends on several factors, including the kind and amount of one or more carbonaceous materials that are included, the type of activation including chemical or thermal activation, and the level of activation that is imparted on the carbonaceous material to thereby form the precursor activated carbon. Performance of the precursor activated carbon is also affected by other processing steps such as the crushing and sizing of reagglomerated carbonaceous material particles, the level of residual binder, and the final size of the precursor activated carbon.

In all embodiments, the precursor activated carbon is not separately treated or oxidized beyond the steps outlined above. Thus, the sorbent capacity with respect to different disinfection byproducts or other contaminant species is substantial because the adsorptive capacity of the precursor activated carbon itself is maintained and is not particularly dependent on catalytic effects. In certain embodiments, the precursor activated carbon retains substantially all organic compound adsorption capability including adsorption of chloroform, VOCs, PFAS, and emerging contaminants because of the internal pore structure of the precursor activated carbon.

Oxidation of Precursor Activated Carbon

The disclosure contemplates optional oxidation of the precursor activated carbon. In certain embodiments, the precursor activated carbon is oxidized after it is activated. In other embodiments, the precursor activated carbon is not oxidized after it is activated. Oxidation of the precursor activated carbon means that the precursor activated carbon is exposed to oxygen molecules at temperatures sufficient to impart oxygen species or complexes on the surface of the activated carbon. Oxidation does not contemplate substantial modification of the pore structure of the precursor activated carbon.

For example, in some embodiments, oxidation is performed by exposing the feedstock to an oxygen containing environment and heating the feedstock to a temperature of about 150° C. to about 1050° C. The temperature of oxidizing can be about 150° C. to about 250° C., about 250° C. to about 350° C., about 350° C. to about 450° C., about 450° C. to about 550° C., about 550° C. to about 650° C., about 650° C. to about 750° C., or about 750° C. to about 850° C., or any of those disclosed endpoints, or any range that is made of a combination of any of the above ranges or values within those ranges. In different embodiments, the oxygen containing environment is one or more of atmospheric air, oxygen gas ($O_2$), oxygen plasma, hydrogen peroxide ($H_2O_2$), ozone ($O_3$), nitrous oxide ($N_2O$), or carbon dioxide ($CO_2$).

In some embodiments, the oxygen containing environment is dry, and includes no moisture or substantially no measurable moisture. The selection of the oxidizing temperature and the oxidant and oxidizing process does not substantially modify the pore structure of the precursor activated carbon. Thus, if a more oxidizing oxygen containing environment is selected, temperatures must be lowered to reduce the potential that additional activation will occur. Alternatively, if a higher temperature is selected, a less oxidizing oxygen containing environment must be selected to reduce the potential that additional activation will occur.

Oxidation can also be accomplished electrochemically. It should be noted that carbons slowly oxidize in the presence of air with or without moisture at room temperature and this oxidation, although slow, would eventually be sufficient to produce an oxidized carbon precursor. Alternately, the carbon may be oxidized in a non-thermal process using hydrogen peroxide, ozone, chlorine, persulfates, percarbonates, oxidizing acids such as nitric acid, air, pure oxygen or any combination thereof in the liquid or vapor phase at temperatures less than about 100° C. In some embodiments, the oxidizing step is omitted, i.e., the sorbent feedstock is not oxidized by any step faster than the above described slow oxidation that takes place naturally at room temperature under normal conditions.

Cu—Fe—N Doping

After the precursor activated carbon is prepared and optionally oxidized, the precursor activated carbon is further treated by doping with copper-iron-nitrogen (Cu—Fe—N) compounds. Doping with Cu—Fe—N imparts Cu—Fe—N complexes on the surface of the precursor activated carbon, thereby serving to catalyze disinfection byproducts. Doping is achieved by contacting the precursor activated carbon with at least one copper source, at least one iron source, and at least one nitrogen source. In some embodiments, a single compound is the source of all three of copper, iron, and nitrogen. In still other embodiments, a first compound is the source of copper and iron, and a second compound is the source of nitrogen. In still other embodiments, a single compound is the source of the copper and nitrogen, and a second compound is the source of the iron. In still other embodiments, a single compound is the source of the iron and the nitrogen, and a second compounds is a source of the copper.

The copper source is not limited, and includes one or more of copper(II) sulfate pentahydrate ($CuSO_4 \cdot 5H_2O$), copper(II) chloride ($CuCl_2$), copper(II) chloride dihydrate ($CuCl_2 \cdot 2H_2O$), copper(II) nitrate ($Cu(NO_3)_2$), copper(II) nitrate monohydrate ($Cu(NO_3)_2 \cdot H_2O$), copper(II) nitrate sesquihydrate ($Cu(NO_3)_2 \cdot 1.5H_2O$), copper(II) nitrate hemipentahydrate ($Cu(NO_3)_2 \cdot 2.5H_2O$), copper(II) nitrate trihydrate ($Cu(NO_3)_2 \cdot 3H_2O$), copper(II) nitrate hexahydrate (($[Cu(H_2O)_6](NO_3)_2$)), copper(II) acetate ($Cu(CH_3COO)_2$), copper(II) acetate monohydrate ($Cu(CH_3COO)_2 \, H_2O$), Copper (II) formate tetrahydrate, $Cu(NH_3)_6^{+2}$ copper carbonate hydroxide, $Cu_2(OH)_2CO_3$, compounds thereof, or mixtures thereof, or combinations thereof. In some embodiments, the copper source is provided as part of an aqueous solution. The iron source is not limited, and includes one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate (($NH_4)_3Fe(C_2O_4)_3 \cdot 3H_2O$), ammonium hexacyanoferrate(II) hydrate ((NH$_4$)$_4$[Fe(CN)$_6$]·xH$_2$O), ammonium iron(III) citrate ((NH$_4$)$_5$[Fe(C$_6$H$_4$O$_7$)$_2$]), sodium ferrocyanide decahydrate (Na$_3$Fe(CN)$_6$·10H$_2$O), sodium ferrioxalate (Na$_3$Fe(C$_2$O$_4$)$_3$), potassium ferrocyanide trihydrate (K$_2$[Fe(CN)$_6$]·3H$_2$O), potassium ferricyanide (K$_3$[Fe(CN)$_6$]), potassium ferrooxalate (K$_2$[Fe(C$_2$O$_4$)$_2$]), iron(II) acetate tetrahydrate ((CH$_3$COO)$_2$Fe·4H$_2$O), ferrous lactate dihydrate, ferrous lactate trihydrate, urea (CO(NH$_2$)$_2$), dicyandiamide (DCD), compounds thereof, mixtures thereof, or combinations thereof. In some embodiments, the iron source is provided as part of an aqueous solution. The nitrogen source is not limited and in some embodiments includes any source of nitrogen with a −3 oxidation state. Examples of nitrogen sources that have a −3 oxidation state include one or more of urea which has the formula CO(NH$_2$)$_2$ or dicyandiamide (DCD) or compounds thereof, mixtures thereof, or combinations thereof. In some embodiments, the nitrogen source is provided as part of an aqueous solution. It should be noted that anhydrous copper salt or iron salt precursors, including CuCl$_2$, FeCl$_3$, and FeCl$_2$, are analogous to hydrated counterparts including CuCl$_2$·2H$_2$O, FeCl$_3$·6H$_2$O, and FeCl$_2$·4H$_2$O for the doping process.

While the above description of the nitrogen source or the single source of iron or copper combined with nitrogen or the single source of iron, copper, and nitrogen includes several listed compounds, such compounds of combinations of compounds are not so limited. In particular Applicants discovered that those nitrogen compounds that have an oxidation state of −3 provided resulted in excellent performance. Therefore, in some embodiments, the nitrogen source is not limited so long as the nitrogen source has an oxidation state of −3. It is not believed that the oxidation state of the copper or iron is important to the results.

The doping process is not limited. In some embodiments, doping is performed in a single stage. In a single stage process, the precursor activated carbon is treated by contacting it with a single solution, and that single solution includes the copper compounds, the iron compounds and the nitrogen compounds. For example, in one embodiment, the doping is performed in a single stage by contacting the precursor activated carbon with an aqueous solution containing copper(II) sulfate pentahydrate, iron(III) chloride hexahydrate, and urea. In another embodiment, the doping is performed in a single stage by contacting the precursor activated carbon with an aqueous solution containing copper(II) sulfate pentahydrate, iron(III) chloride hexahydrate, and dicyandiamide.

In the single stage process of doping the precursor activated carbon, the amount of copper compounds, the amount of iron compounds, and the amount of nitrogen compounds that are doped can be controlled by one or more of varying the concentration of the copper compound in solution, varying the concentration of the iron compound in solution, varying the concentration of nitrogen concentration in solution, varying the amount of time that the solution contacts the precursor activated carbon, or varying the temperature of the solution.

After doping is achieved with solution in the single stage process, the precursor activated carbon is dried to remove water or other solvent, with the copper, iron, and nitrogen compounds thereby remaining on the precursor activated carbon. The process of drying is not limited and is performed by drying in air at about 100° C. to about 150° C. for up to 2 hours.

Following the single stage process, the resultant doped and dried precursor activated carbon includes copper, iron, and nitrogen in various amounts. For example, the amount of copper that is added when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of iron that is added when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of nitrogen when measured on a dry precursor activated carbon basis is about 1.5 wt. %, about 2.0 wt. %, about 2.2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.3 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 16.7 wt. %, about 17.0 wt. %, about 17.5 wt. %, about 18.0 wt. %, about 18.5 wt. %, about 19.0 wt. %, about 19.5 wt. %, about 20.0 wt. %, or any range that includes one or more of the above values as endpoints.

Figure 2:
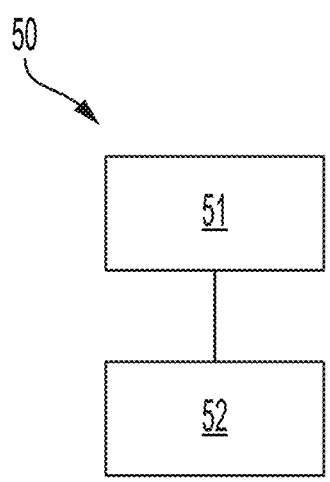
FIG. 2 depicts a process in accordance with an embodiment.

FIG. 2 shows one embodiment of the doping process 50 in a single stage configuration. In the doping process 50, the precursor activated carbon is contacted with an aqueous solution containing a copper source, an iron source, and a nitrogen source, shown by box 51. Next, the contacted precursor activated carbon is dried 52. After drying, doped precursor activated carbon is ready for calcining.

In another embodiment of the single stage process, the precursor activated carbon is provided and subsequently sprayed with an aqueous solution that includes dissolved copper(II) sulfate pentahydrate, urea, and dissolved iron(III) chloride hexahydrate dopants. The precursor activated carbon then stands for a predetermined period of time. After standing, the precursor activated carbon is dried for a predetermined period of time and at a predetermined temperature. By way of example, the aqueous solution adds about 0.19 wt. % Cu, about 12.1 wt. % N, and about 0.19 wt. % Fe, with each measured by the weight of the dry precursor activated carbon. Additionally, the standing time can be about 40 minutes, about 50 minutes, about 60 minutes, about 70 minutes, or about 80 minutes. Drying is performed at a temperature of about 100° C. for about 4 hours, though the drying is not limited and these times and temperatures can vary. Once the drying step is completed, the doped precursor activated carbon is ready for calcining.

In an alternative embodiment, doping is performed in a two-stages. In a two-stage process, the precursor activated carbon is treated by first contacting it with a solution that contains copper and iron, optionally drying the precursor activated carbon containing copper and iron, second contacting the precursor activated carbon containing copper and iron with a solution that contains nitrogen, and drying the precursor activated carbon that contains copper, iron, and nitrogen. In another two stage process the precursor activated carbon is treated by first contacting it with a solution that contains copper and nitrogen, optionally drying the precursor activated carbon containing copper and nitrogen, second contacting the precursor activated carbon containing copper and nitrogen with a solution that contains iron, and drying the precursor activated carbon that contains copper, iron, and nitrogen. In another two stage process the precursor activated carbon is treated by first contacting it with a solution that contains copper and nitrogen, optionally drying the precursor activated carbon containing copper and nitrogen, second contacting the precursor activated carbon containing copper and nitrogen with a solution that contains iron, and drying the precursor activated carbon that contains copper, iron, and nitrogen. In another two stage process the precursor activated carbon is treated by first contacting it with a solution that contains iron and nitrogen, optionally drying the precursor activated carbon containing iron and nitrogen, second contacting the precursor activated carbon containing iron and nitrogen with a solution that contains copper, and drying the precursor activated carbon that contains copper, iron, and nitrogen.

In one such embodiment, the doping is performed in two stages by first contacting the precursor activated carbon with an aqueous solution containing dissolved copper(II) sulfate pentahydrate and an aqueous solution containing dissolved iron(III) chloride hexahydrate and second contacting the precursor activated carbon with an aqueous solution of urea. In one such embodiment, the doping is performed in two stages by first contacting the precursor activated carbon with an aqueous solution containing dissolved copper(II) sulfate pentahydrate and an aqueous solution of urea and second contacting the precursor activated carbon with an aqueous solution containing dissolved iron(III) chloride hexahydrate. In one such embodiment, the doping is performed in two stages by first contacting the precursor activated carbon with an aqueous solution containing dissolved iron(III) chloride hexahydrate and an aqueous solution of urea and second contacting the precursor activated carbon with an aqueous solution containing dissolved copper(II) sulfate pentahydrate.

In another embodiment, the two stage doping is performed by contacting the precursor activated carbon with an aqueous solution containing dissolved copper(II) sulfate pentahydrate and an aqueous solution containing dissolved iron(III) chloride hexahydrate and second contacting the precursor activated carbon with an aqueous solution of dicyandiamide. In another embodiment, the doping is performed in two stages by first contacting the precursor activated carbon with an aqueous solution containing dissolved copper(II) sulfate pentahydrate and an aqueous solution of dicyandiamide and second contacting the precursor activated carbon with an aqueous solution containing dissolved iron(III) chloride hexahydrate. In another embodiment, the doping is performed in two stages by first contacting the precursor activated carbon with an aqueous solution containing dissolved iron(III) chloride hexahydrate and an aqueous solution of dicyandiamide and second contacting the precursor activated carbon with an aqueous solution containing dissolved copper(II) sulfate pentahydrate.

In the two stage process of doping the precursor activated carbon, the amount of copper compounds, the amount of iron compounds, and the amount of nitrogen compounds that are doped can be controlled by one or more of varying the concentration of the copper compound in solution, varying the concentration of the iron compound in solution, varying the concentration of nitrogen concentration in solution, varying the amount of time that one or more of the solution containing copper, solution containing iron, or the solution containing nitrogen contacts the precursor activated carbon, or varying the temperature of one or more of the solution containing copper, solution containing iron, or the solution containing nitrogen.

Following the two stage process, the resultant doped and dried precursor activated carbon includes copper, iron, and nitrogen in specified amounts. For example, the amount of copper when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %. The amount of iron when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of nitrogen when measured on a dry precursor activated carbon basis is about 1.5 wt. %, about 2.0 wt. %, about 2.2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.3 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 16.7 wt. %, about 17.0 wt. %, about 17.5 wt. %, about 18.0 wt. %, about 18.5 wt. %, about 19.0 wt. %, about 19.5 wt. %, about 20.0 wt. %, or any range that includes one or more of the above values as endpoints.

Figure 3:
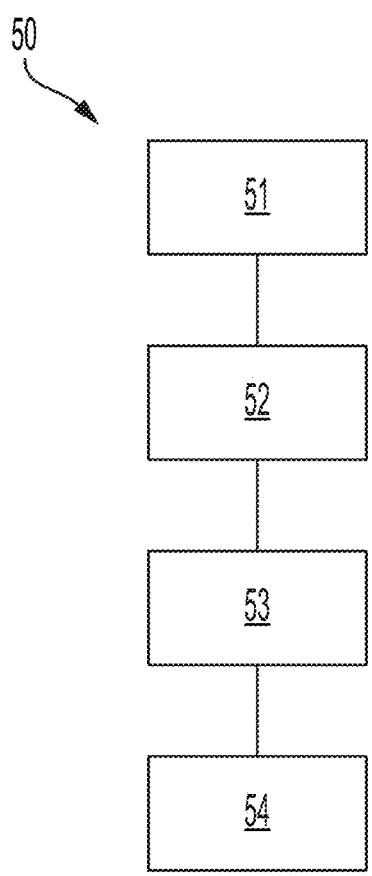
FIG. 3 depicts a process in accordance with an embodiment.

FIG. 3 shows one embodiment of the doping process 50 in a two stage configuration. In the doping process 50, the precursor activated carbon is contacted with an aqueous solution containing a copper source and an iron source, shown by box 51. Next, precursor activated carbon is dried 52. After drying 52, the precursor activated carbon is contacted with an aqueous solution containing a nitrogen source, shown by box 53. After contacting with the nitrogen source containing aqueous solution, the precursor activated carbon is dried 54. After this second drying step, the doped precursor activated carbon is ready for calcining.

In an alternative embodiment, doping is performed in three-stages. In a three stage process, the precursor activated carbon is treated by first contacting it with a solution that contains copper, optionally drying the precursor activated carbon containing copper, second contacting the precursor activated carbon containing copper with a solution that contains iron, optionally drying the precursor activated carbon containing copper and iron, third contacting the precursor activated carbon containing copper and iron with a solution that contains nitrogen, and drying the precursor activated carbon that contains copper, iron, and nitrogen. In another three stage process, the precursor activated carbon is treated by first contacting it with a solution that contains iron, optionally drying the precursor activated carbon containing iron, second contacting the precursor activated carbon containing iron with a solution that contains copper, optionally drying the precursor activated carbon containing iron and copper, third contacting the precursor activated carbon containing iron and copper with a solution that contains nitrogen, and drying the precursor activated carbon that contains copper, iron, and nitrogen. In another three stage process, the precursor activated carbon is treated by first contacting it with a solution that contains copper, optionally drying the precursor activated carbon containing copper, second contacting the precursor activated carbon containing copper with a solution that contains nitrogen, optionally drying the precursor activated carbon containing copper and nitrogen, third contacting the precursor activated carbon containing copper and nitrogen with a solution that contains iron, and drying the precursor activated carbon that contains copper, iron, and nitrogen. In another three stage process, the precursor activated carbon is treated by first contacting it with a solution that contains iron, optionally drying the precursor activated carbon containing iron, second contacting the precursor activated carbon containing copper with a solution that contains nitrogen, optionally drying the precursor activated carbon containing iron and nitrogen, third contacting the precursor activated carbon containing iron and nitrogen with a solution that contains copper, and drying the precursor activated carbon that contains copper, iron, and nitrogen. In another three stage process, the precursor activated carbon is treated by first contacting it with a solution that contains nitrogen, optionally drying the precursor activated carbon containing nitrogen, second contacting the precursor activated carbon containing nitrogen with a solution that contains copper, optionally drying the precursor activated carbon containing nitrogen and copper, third contacting the precursor activated carbon containing nitrogen and copper with a solution that contains iron, and drying the precursor activated carbon that contains copper, iron, and nitrogen. In another three stage process, the precursor activated carbon is treated by first contacting it with a solution that contains nitrogen, optionally drying the precursor activated carbon containing nitrogen, second contacting the precursor activated carbon containing nitrogen with a solution that contains iron, optionally drying the precursor activated carbon containing nitrogen and iron, third contacting the precursor activated carbon containing nitrogen and iron with a solution that contains copper, and drying the precursor activated carbon that contains copper, iron, and nitrogen.

In one such embodiment, the doping is performed in three stages by first contacting the precursor activated carbon with an aqueous solution containing dissolved copper(II) sulfate pentahydrate, second contacting the precursor activated carbon with an aqueous solution containing dissolved iron(III) chloride hexahydrate, and third contacting the precursor activated carbon with an aqueous solution of urea. In another embodiment, the doping is performed in three stages by first contacting the precursor activated carbon with an aqueous solution containing dissolved iron(III) chloride hexahydrate, second contacting the precursor activated carbon with an aqueous solution containing dissolved copper(II) sulfate pentahydrate, and third contacting the precursor activated carbon with an aqueous solution of urea. In another embodiment, the doping is performed in three stages by first contacting the precursor activated carbon with an aqueous solution containing dissolved copper(II) sulfate pentahydrate, second contacting the precursor activated carbon with an aqueous solution of urea, and third contacting the precursor activated carbon with an aqueous solution containing dissolved iron(III) chloride hexahydrate. In another embodiment, the doping is performed in three stages by first contacting the precursor activated carbon with an aqueous solution containing dissolved iron(III) chloride hexahydrate, second contacting the precursor activated carbon with an aqueous solution of urea, and third contacting the precursor activated carbon with an aqueous solution of dissolved copper(II) sulfate pentahydrate. In another embodiment, the doping is performed in three stages by first contacting the precursor activated carbon with an aqueous solution of urea, second contacting the precursor activated carbon with an aqueous solution containing dissolved copper(II) sulfate pentahydrate, and third contacting the precursor activated carbon with an aqueous solution containing dissolved iron (III) chloride hexahydrate. In another embodiment, the doping is performed in three stages by first contacting the precursor activated carbon with an aqueous solution of urea, second contacting the precursor activated carbon with an aqueous solution containing dissolved iron(III) chloride hexahydrate, and third contacting the precursor activated carbon with an aqueous solution of dissolved copper(II) sulfate pentahydrate.

In another embodiment, the three stage doping is performed by first contacting the precursor activated carbon with an aqueous solution of dissolved copper(II) sulfate pentahydrate, second contacting the precursor activated carbon with an aqueous solution containing dissolved iron(III) chloride hexahydrate, and third contacting the precursor activated carbon with an aqueous solution of dicyandiamide. In another embodiment, the doping is performed in three stages by first contacting the precursor activated carbon with an aqueous solution containing dissolved iron(III) chloride hexahydrate, second contacting the precursor activated carbon with an aqueous solution containing dissolved copper (II) sulfate pentahydrate, and third contacting the precursor activated carbon with an aqueous solution of dicyandiamide. In another embodiment, the doping is performed in three stages by first contacting the precursor activated carbon with an aqueous solution containing dissolved copper(II) sulfate pentahydrate, second contacting the precursor activated carbon with an aqueous solution of dicyandiamide, and third contacting the precursor activated carbon with an aqueous solution containing dissolved iron(III) chloride hexahydrate. In another embodiment, the doping is performed in three stages by first contacting the precursor activated carbon with an aqueous solution containing dissolved iron(III) chloride hexahydrate, second contacting the precursor activated carbon with an aqueous solution of dicyandiamide, and third contacting the precursor activated carbon with an aqueous solution containing dissolved copper(II) sulfate pentahydrate. In another embodiment, the doping is performed in three stages by first contacting the precursor activated carbon with an aqueous solution of dicyandiamide, second contacting the precursor activated carbon with an aqueous solution containing dissolved copper(II) sulfate pentahydrate, and third contacting the precursor activated carbon with an aqueous solution containing dissolved iron(III) chloride hexahydrate. In another embodiment, the doping is performed in three stages by first contacting the precursor activated carbon with an aqueous solution of dicyandiamide, second contacting the precursor activated carbon with an aqueous solution containing dissolved iron(III) chloride hexahydrate, and third contacting the precursor activated carbon with an aqueous solution containing dissolved copper(II) sulfate pentahydrate.

In the three stage process of doping the precursor activated carbon, the amount of copper compounds, the amount of iron compounds, and the amount of nitrogen compounds that are doped can be controlled by one or more of varying the concentration of the copper compound in solution, varying the concentration of the iron compound in solution, varying the concentration of nitrogen concentration in solution, varying the amount of time that one or more of the solution containing copper, solution containing iron, or the solution containing nitrogen contacts the precursor activated carbon, or varying the temperature of one or more of the solution containing copper, solution containing iron, or the solution containing nitrogen.

Following the three stage process, the resultant doped and dried precursor activated carbon includes copper, iron, and nitrogen in specified amounts. For example, the amount of copper that is added when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of iron that is added when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of nitrogen when measured on a dry precursor activated carbon basis is about 1.5 wt. %, about 2.0 wt. %, about 2.2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.3 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 16.7 wt. %, about 17.0 wt. %, about 17.5 wt. %, about 18.0 wt. %, about 18.5 wt. %, about 19.0 wt. %, about 19.5 wt. %, about 20.0 wt. %, or any range that includes one or more of the above values as endpoints.

While the single stage, the two stage, and the three stage Cu—Fe—N doping processes are disclosed above, the processes are not so limited. For example, additional dopants can be applied in additional stages or as part of any of the solutions that contact the precursor activated carbon.

The ratio of iron and copper is not limited. In some embodiments, the ratio of iron to copper is about 10:90 to about 90:10, about 30:70 to about 70:30, about 60:40 to about 40:60, about 50:50, or any range that includes that falls within the preceding listed ranges.

Thermal Processing/Calcination

After the completion of one or more of the single stage, two stage, and three stage Cu—Fe—N doping processes, the doped precursor activated carbon is ready for thermal processing, which is also referred to as calcination. During calcination, the doped precursor activated carbon is heated in the presence of an inert atmosphere to achieve additional changes in the doped precursor activated carbon.

The temperature of calcination of the doped precursor activated carbon is not limited. In some embodiments, calcination takes place at a temperature of about 400° C., about 450° C., about 500° C., about 550° C., about 600° C., about 650° C., about 700° C., about 750° C., about 800° C., about 850° C., about 900° C., about 950° C., about 1000° C., about 1050° C., or any range that includes one or more of the above values as endpoints. In one embodiment, the temperature of calcination is about 900° C. to about 1000° C.

The inert atmosphere for calcination is one that does not cause any substantial oxidation or activation of the doped precursor activated carbon at the specified temperatures so as not to alter the pore structure of the doped precursor activated carbon. Thus, in many embodiments, the atmosphere contains no oxygen, carbon dioxide, or water, or the atmosphere contains amounts of oxygen, carbon dioxide, or water that are so small as to not cause any oxidation or activation. Examples of atmospheres for calcination include one or more of nitrogen gas ($N_2$), helium, neon, argon, krypton, xenon, and combinations thereof. When calcination is complete, the resultant product is referred to as sorbent material.

In some embodiments, the sorbent material is granular activated carbon (GAC), which is defined as activated carbon particles sized to be retained on a 50-mesh sieve (holes of about 0.300 mm). In other embodiments, the sorbent material is powdered activated carbon (PAC), which is defined as particles that pass through an 80-mesh sieve (holes of about 0.180 mm). While these particle size ranges are mentioned for activated carbon sorbent materials, it is also contemplated that any of the disclosed sorbent materials may be measured by the above 50-mesh and 80-mesh sieve sizes. In still other embodiments, the sorbent material is pelletized activated carbon.

Performance Measurement/Sorbent Characterization

The performance of the sorbent materials of the disclosure is measured in various ways, including the "chloramine destruction number" (CDN) which defined below. The chloramine destruction number quantifies the amount of chloramine that can be removed from a fluid by the sorbent materials of the disclosure. The measurement of the CDN is known in the art, for example in U.S. Pat. No. 10,702,853 patented on Jul. 7, 2020 and titled "CHLORAMINE AND CHLORINE REMOVAL MATERIAL AND METHODS FOR MAKING THE SAME," which is incorporated by reference herein in its entirety.

The CDN is the absolute value of the first order linear kinetic fit, multiplied by 1000, that is applied to a natural log of a concentration of chloramine in water versus time, where the initial concentration of chloramine is decreased over a period of 150 minutes. When ammonia is in equilibrium with chlorine in solution the form of chloramine is pH dependent. The chloramine solution comprised ammonium chloride; sodium hypochlorite and deionized water were mixed to obtain a 1 L solution of 300 ppm chloramine at a pH of 9.0. At a pH value of 9.0, the chloramine species that is present at equilibrium is the mono-chloramine form, which is the most difficult to destroy. The solution was buffered using sodium carbonate to maintain the solution pH during evaluation. The chlorine solution comprised sodium hyprochlorite and deionized water to obtain 1 L of a 300 ppm chlorine solution. One liter of the 300 ppm respective solution was added to an Erlenmeyer flask that was placed in a water bath controlled to 20° C. A constant volume of 2.0 mL activated carbon (sized at 80×325 mesh) was added to the agitated 1 L chloramine or chlorine solution for each sample analysis. The volume of the carbon used was determined from the apparent density of the 80×325 carbon as determined by ASTM Method D-2854. The concentration of total chlorine in solution was measured at various time points over a 150 min period by taking aliquots and then analyzing using a standard HACH colorimetric EPA accepted method 10070 for total chlorine.

After a sorbent material is analyzed experimentally, the concentration versus time data for each sorbent material sample is replotted as the natural log of total chlorine concentration versus time to linearize the data according to first order kinetic theory. A linear fit is then applied to the data and the slope of the linear fit is determined. The slope is always negative because the initial concentration of total chlorine decreases over the 150 min period. As a result the absolute value of the slope multiplied by 1000 is used quantify the rate of chloramine and chlorine destruction (removal). The larger the absolute slope, the more effective the sorbent material is at removing chlorine and chloramine. For these measurements, the slope resulting from the linear fit of the first order kinetic experimental data (again multiplied by 1000) is referred to as the "chloramine destruction number" or CDN. In the case of chlorine destruction this rate is referred to as the "chlorine destruction number" of Cl-DN. These values quantify the amount of chloramine and/or chlorine which can be removed from water by the sorbent materials or sorbents of the disclosure.

In addition to chloramine, this disclosure is also effective at removing chlorine from fluids such as aqueous streams. The ability of the calcined activated carbon to remove chlorine was assessed as described above, however the test solution is made without the addition of ammonium chloride, and therefore the solution contains 300 ppm chlorine. Sorbent material particle size for chlorine analysis was 95% at about 325 mesh. The analysis of the chlorine concentration versus time data and the corresponding first order kinetic slope remains the same, however, and the slope of the linear fit of this data is referred to as the "chlorine destruction number" or Cl-DN, which again quantifies the amount of chlorine which can be removed from water by the sorbent materials or sorbents of the disclosure.

For the CDN, the disclosure contemplates values of about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 12.0, about 12.5, about 13.0, about 13.5, about 14.0, about 14.5, about 15.0, about 15.5, about 16.0, about 16.5, about 17.0, about 17.5, about 18.0, about, 18.5, about 19.0, about 19.5, about 20.0, about 20.5, about 21.0, about 21.5, about 22.0, about 22.5, about 23.0, about 23.5, about 24.0, about 24.5, about 25.0, about 25.5, about 26.0, about 26.5, about 27.5, about 28.0, about 28.5, about 29.0, about 29.5, about 30.0, about 35.0, about 40.0, about 45.0, about 50.0, about 55.0, about 60.0, about 65.0, about 70.0, about 75.0, about 80.0, about 85.0, about 90.0, about 95.0, about 100.0, about 105.0, about 110.0, about 115.0, about 120.0, about 125.0, about 130.0, about 135.0, about 140.0, about 145.0, about 150.0, or any range that includes at least two of these values as the endpoints. Alternatively, the CDN can be a range with these numbers as a lower performance bound, such as at least about 4.0, at least about 4.5, at least about 5.0, at least about 10.0, at least about 15.0, at least about 20.0, at least about 23.0, at least about 50.0, at least about 75.0, or at least about 100.0. In some embodiments, the chloramine destruction number is measured with respect to mono-chloramine.

The "peroxide destruction number" which is also referred to as the "peroxide number" is also measured. The peroxide number is a volumetric test, which means that performance is measured and normalized to a specified volume of sorbent material. The test for the peroxide number is well known in the art, and is described for example by U.S. Pat. No. 5,470,748, which is incorporated by reference herein in its entirety.

During the test of the peroxide number, the sorbent material is first pulverized to a fine mesh size fraction where at least 90 wt. %, and in certain tests at least 95 wt. %, of the sorbent will pass through a 325 mesh U.S. Standard Series sieve (44 μm opening size). A specified amount of the pulverized sorbent material is placed in a vacuum flask (Dewar), and 100 mL of deionized water is added to the vacuum flask. The addition of the deionized water is performed such that any pulverized sorbent material clinging to the sides of the vacuum flask is carried into the main body of water at the bottom of the vacuum flask. Next, a 50 mL aliquot of aqueous buffer solution is added to the vacuum flask. The aqueous buffer solution is 0.5 molar in $K_2HPO_4$ and 0.5 molar in $KH_2PO_4$. After the aqueous buffer solution is added, a magnetic stir bar is added into the vacuum flask and energized to begin stirring. Stirring speed is increased until a vortex greater than about 0.5 inches (1.27 cm) deep is formed in the mixture and the optimum stir bar speed is achieved. The optimum stir bar speed is selected so that additional increases in stir bar speed do not significantly affect the peroxide decomposition time.

As described in the previous paragraph, during the test of the peroxide number, a specified amount of the sorbent material is added to a buffered hydrogen peroxide solution. Because the test is a volumetric test, the specified amount of sorbent material that is added to the buffered hydrogen peroxide solution is based on one half (½) of the apparent density of the sorbent material. In particular, the mass of sorbent material in grams that is added to the solution is equal to one half (½) of the measured apparent density of the sorbent material, when the apparent density of the sorbent material is reported in g/cm$^3$. In the buffered solution, the catalytic properties of the sorbent material cause the peroxide to be catalyzed and thereby destroyed (i.e., the hydrogen peroxide decomposes into water and oxygen gas).

The catalysis of hydrogen peroxide is exothermic. Thus, the rated of decomposition by way of the sorbent material can be approximated over time by measuring the temperature of the buffered solution. As used herein, the "peroxide number" is the length of time in minutes that is required for the buffered solution containing the sorbent material sample to reach 75% of the recorded maximum temperature. Faster times and therefore smaller values of the peroxide number indicate more catalytic activity and thus a higher performance sorbent material. In some embodiments, the peroxide destruction number measured in minutes is about 1.0, about, about 1.5, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, about 11.0, about 11.1, about 11.2, about 11.3, about 11.4, about 11.5, about 11.6, about 11.7, about 11.8, about 11.9, about 12.0, about 12.1, about 12.2, about 12.3, about 12.4, about 12.5, about 12.6, about 12.7, about 12.8, about 12.9, about 13.0, about 13.1, about 13.2, about 13.3, about 13.4, about 13.5, about 13.6, about 13.7, about 13.8, about 13.9, about 14.0, about 14.1, about 14.2, about 14.3, about 14.4, about 14.5, about 14.6, about 14.7, about 14.8, about 14.9, about 15.0, about 15.1, about 15.2, about 15.3, about 15.4, about 15.5, about 15.6, about 15.7, about 15.8, about 15.9, about 16.0, about 16.1, about 16.2, about 16.3, about 16.4, about 16.5, about 16.6, about 16.7, about 16.8, about 16.9, about 17.0, about 17.1, about 17.2, about 17.3, about 17.4, about 17.5, about 17.6, about 17.7, about 17.8, about 17.9, about 18.0, about 18.1, about 18.2, about 18.3, about 18.4, about 18.5, about 18.6, about 18.7, about 18.8, about 18.9, about 19.0, about 19.1, about 19.2, about 19.3, about 19.4, about 19.5, about 19.6, about 19.7, about 19.8, about 19.9, about 20.0, or any range that is formed from two or more of the above values as endpoints of the range. In some embodiments, the peroxide destruction number measured in minutes is about 10, about 15, about 20, about 25, about 30, about 35, about 40, about 45, or any range that is formed from two or more of the above values as endpoints of the range.

The peroxide number is related to and has some correlation with the CDN and Cl-DN, in that each are measures of the catalytic activity of the sorbent material. However, the correlation is not always exact, because each represents a different aspect of the catalytic activity of a sorbent material. Still further, the catalytic activity is useful only for those compounds that are catalyzed, but other compounds must be adsorbed to be effectively removed from a fluid stream. A superior sorbent material therefore must have good performance in more than one of the CDN, Cl-DN, peroxide number, and adsorption tests so that it is effective at removing a broad range of compounds from fluid streams.

Fluid Treatment

Further embodiments are directed to methods for purifying fluids such as water by using the chlorine and chloramine destroying sorbent materials described above. In one embodiment, a fluid is treated by flowing the fluid over a bed of sorbent material, introducing fluid onto a filter including sorbent material, introducing sorbent material into a container for holding fluid, and the like. In certain embodiments, the above steps are combined in parallel or subsequently in series. In certain embodiments, the fluid is water. In still other embodiments, the fluid is water that is for human, plant, animal, or marine life consumption. In some embodiments, the fluid is in liquid form.

In other embodiments, the methods of purifying fluids includes additional steps. For example, in some embodiments, methods for purifying includes the steps of filtering the fluid using, for example, a screen or sand filter before, after, or both before and after contacting with sorbent material to remove particulates. In further embodiments, the methods include a step of disinfecting the water to remove biological contaminants such as bacteria or other microorganisms, and in some embodiments, the methods include the step of introducing a disinfectant into the fluid or irradiating the fluid with ultraviolet radiation. In still further embodiments, the methods include the step of clarifying the fluid, adjusting the pH of the fluid, and the like and combinations thereof. In each of the above embodiments, the fluid can be water.

EXAMPLES

The following experimental examples are intended to better illustrate specific embodiments, and they are not intended to limit the disclosure.

Single Stage Process Examples

Coconut carbonaceous material was provided, processed and activated. The resultant coconut activated carbon is available from Calgon Carbon Corporation under the product name OLC and is referred to as precursor activated carbon. The coconut activated carbon is a granular activated carbon and tested in the size of 12×40. The precursor activated carbon is oxidized for some tests but is not oxidized for other tests. After the provision of the precursor activated carbon and, in some instances, the optional oxidation step, the precursor activated carbon is ready for doping with Cu, Fe, and N.

During the Fe, Cu, and N doping, a single stage doping process is performed. The single stage doping process dopes the oxidized or the unoxidized precursor activated carbon with copper, iron, and nitrogen. During the single stage doping process, an aqueous solution containing $CuSO_4 \cdot 5H_2O$, $FeCl_3 \cdot 6H_2O$, and urea contacts the oxidized or unoxidized precursor activated carbon to achieve 0.2 wt. % to 1.0 wt. % Cu, achieve 0.2 wt. % to 1.0 wt. % Fe, and 2.2 wt. % to 8.3 wt. % N, to 15 wt. % N on the carbon, measured on a dry precursor activated carbon basis. The aqueous solution contacts the precursor activated carbon for up to 30 minutes at 25° C. After the aqueous solution contacts the precursor activated carbon, the precursor activated carbon is dried to thereby produce a doped precursor activated carbon.

The doped precursor activated carbon is finally calcined. During calcination, the doped precursor activated carbon is heated under a pure $N_2$ atmosphere to a temperature of 950° C. for a duration of 1 hour.

Experimental Results

Figure 4:
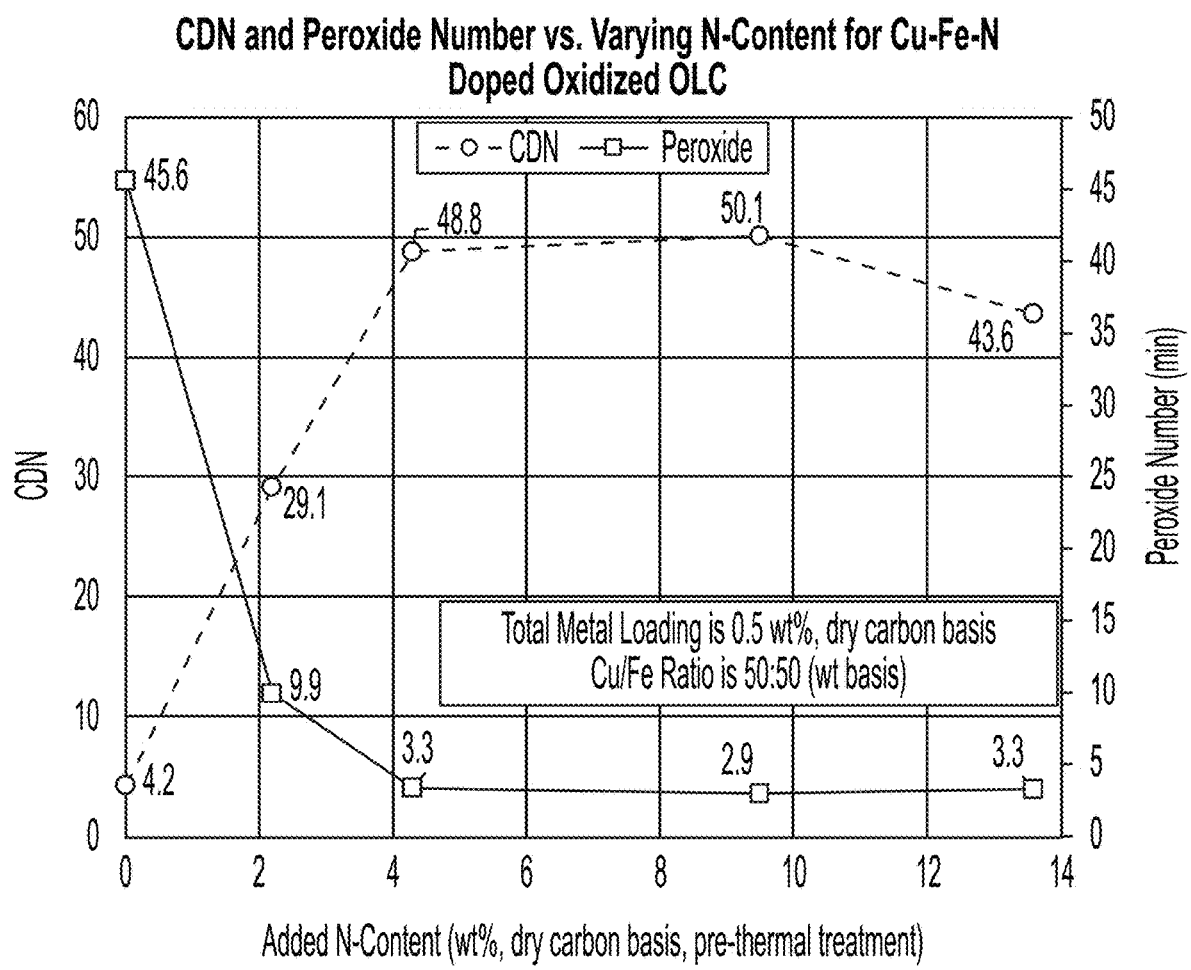
FIG. 4 depicts the CDN and peroxide number versus varying nitrogen content for Cu—Fe—N doped OLC.

FIG. 4 shows the effect on CDN and peroxide number of varying the amount of nitrogen that is doped on the precursor activated carbon while maintaining the total metal level at about 0.5 wt. %. The results shown in FIG. 4 are for precursor activated carbon that was formed from coconut carbonaceous material and subsequently oxidized. Doping added Cu, Fe and N to the this oxidized activated carbon. FIG. 4 shows that, for a 0.5 wt. % total metals loading level, bon with Cu, Fe, and N achieves higher CDN values versus unoxidized precursor activated carbon that is only doped with Cu and N or Fe and N. Doping unoxidized precursor activated carbon formed from coconut carbonaceous material with Cu, Fe, and N achieves faster peroxide destruction number versus only doping with Cu and N, or only Fe and N.

Table 1 shows a comparison between Cu—N, Fe—N, and Cu—Fe—N doped unoxidized activated carbon formed from wood carbonaceous material. When the peroxide number is listed as ">60", it means that no temperature peak was observed after 60 minutes of testing duration and that the true peroxide number is a duration greater than 60 minutes. This is an indicator of poor performance for this metric. BGE is a granular wood-based, activated carbon available from Calgon Carbon Corporation. AquaGuard® is a wood-based catalytic activated carbon for chlorine and chloramine removal in drinking water applications and is available from Ingevity Corporation of North Charleston, South Carolina.

TABLE 1

| Sample Description | Metals Added (wt. %) | Nitrogen Added (wt. % N) | Calcination Time (min) | Calcination Temp (° C.) | AD (g/cm$^3$) | CDN | $H_2O_2$ # (min) |
|---|---|---|---|---|---|---|---|
| AquaGuard ® | — | — | — | — | 0.313 | 3.5 | 63.4 |
| BGE (Unoxidized Feedstock) | — | — | — | 950 | 0.270 | 2.0 | >60 |
| BGE (Cu—Fe—N, 50:50 Cu—Fe) | 0.25 | 9.5 | 60 | 950 | 0.297 | 8.1 | 12.4 |
| BGE (Urea Only) | | 9.5 | 60 | 950 | 0.294 | 2.0 | 96.6 |
| BGE (Cu Only) | 0.25 | — | 60 | 950 | 0.283 | 2.7 | >60 |
| BGE (Fe Only) | 0.25 | — | 60 | 950 | 0.287 | 2.2 | >60 |

CDN and peroxide destruction numbers do not substantially increase after about 4 wt. % nitrogen is doped.

Figure 5:
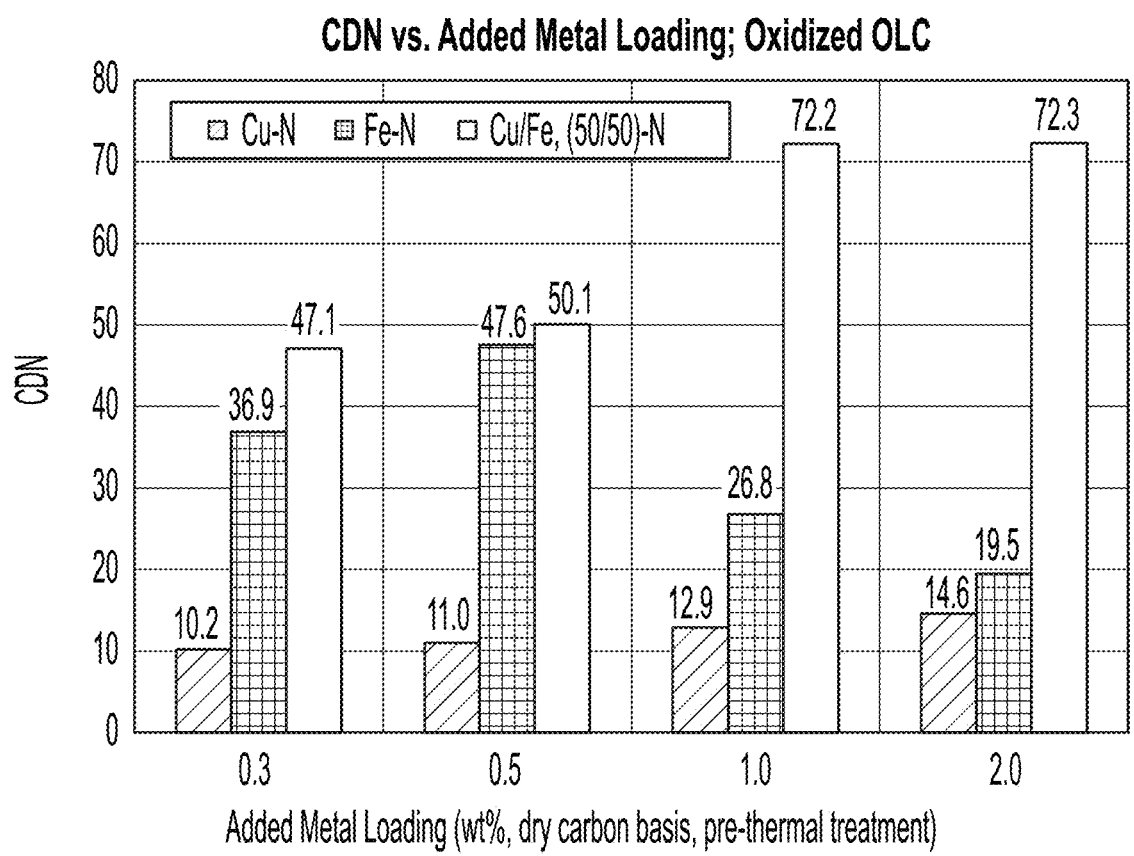
FIG. 5 depicts the CDN versus added metal loading with oxidized OLC.
Figure 6:
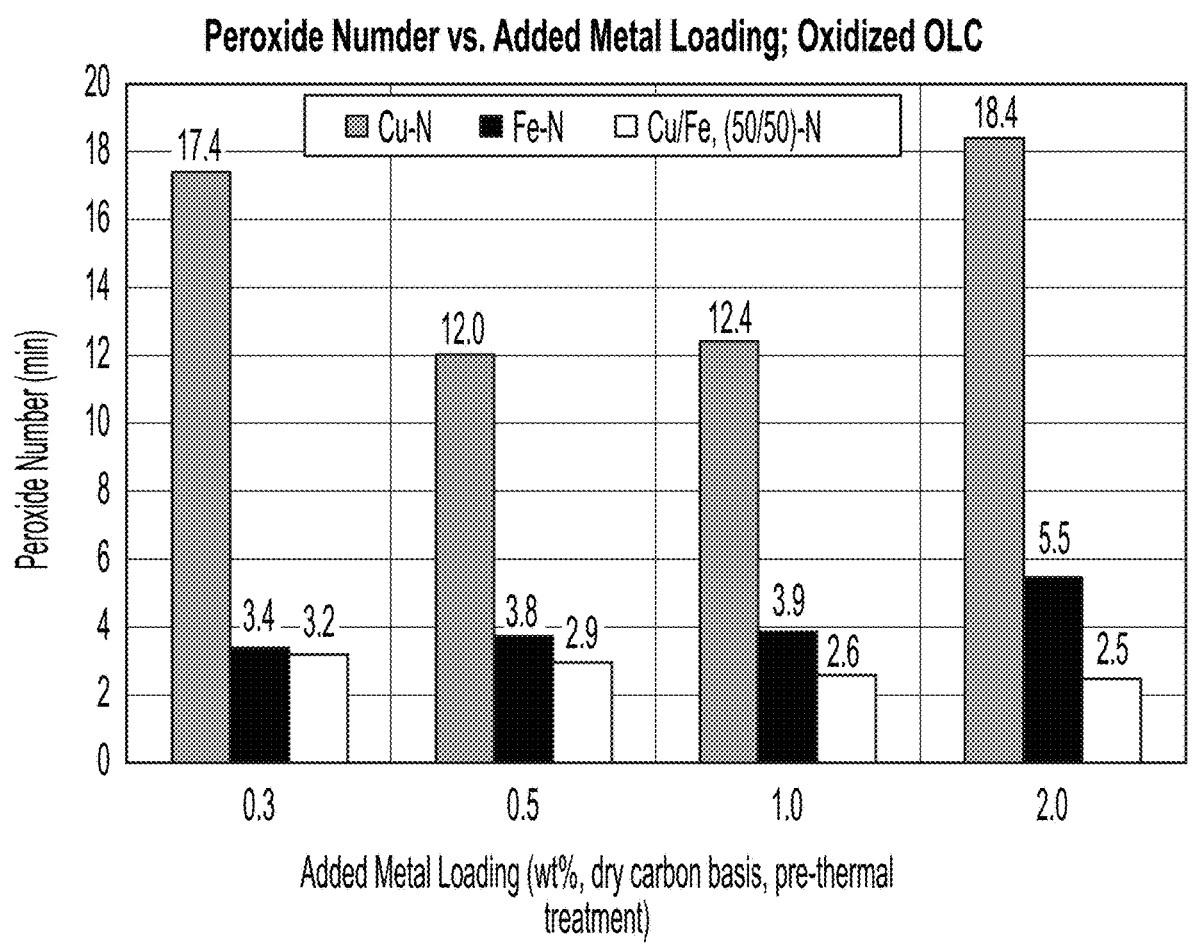
FIG. 6 depicts the peroxide number versus added metal loading with oxidized OLC.

FIG. 5 and FIG. 6 demonstrate the effect of metal doping of the precursor activated carbon on both CDN and peroxide destruction numbers for Cu, Fe, and N doped oxidized precursor activated carbon that is prepared from coconut carbonaceous material. Doping such activated carbon precursor with Cu, Fe, and N achieves higher CDN values versus doping with Cu and N or Fe and N precursor activated carbon that is formed from coconut carbonaceous material. Such doping with Cu, Fe, and N also achieves faster (and therefore superior) peroxide destruction numbers versus Cu and N or Fe and N doping.

Figure 7:
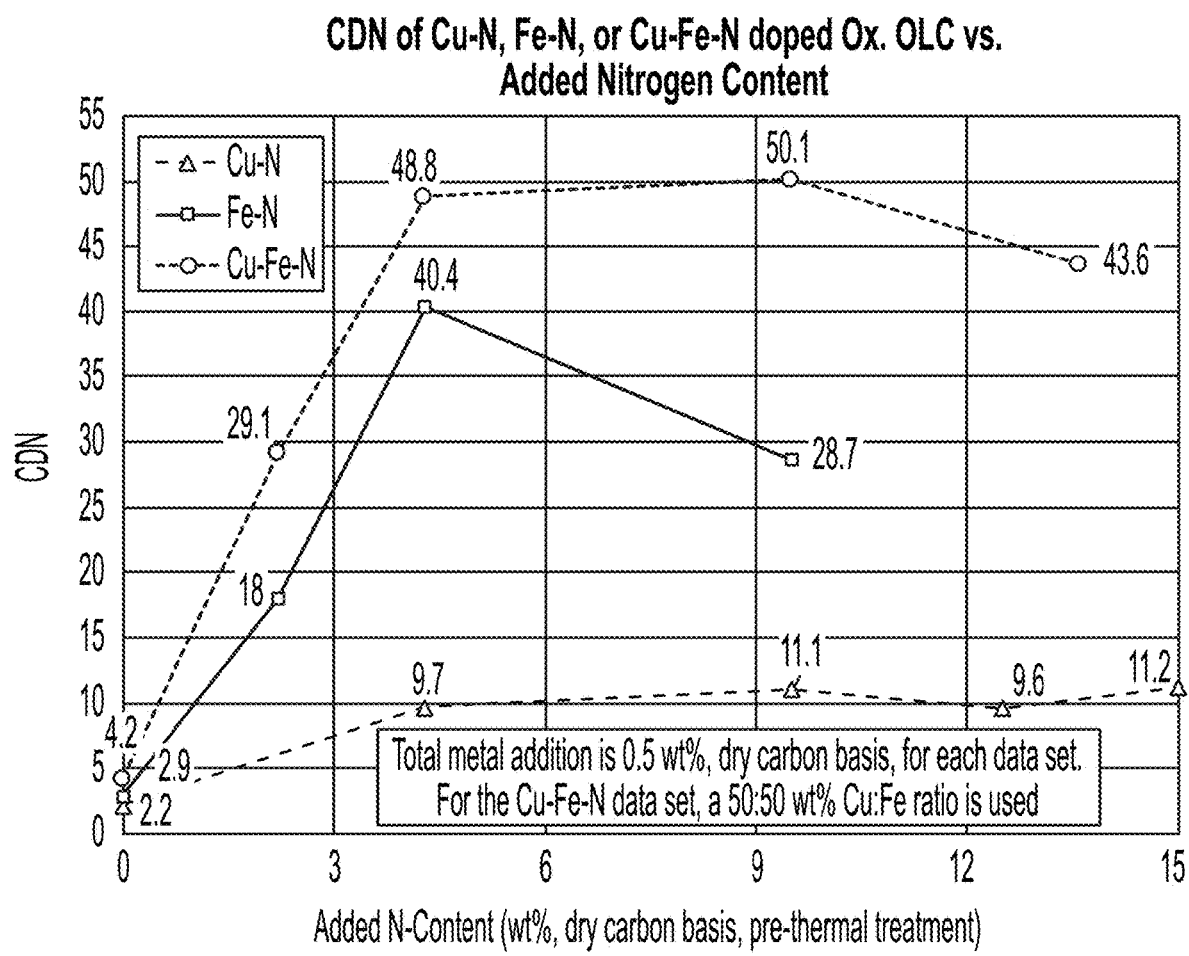
FIG. 7 depicts the CDN of Cu—N, Fe—N, or Cu—Fe—N doped oxidized OLC versus added nitrogen content.

FIG. 7 shows a comparison of the effect on CDN and peroxide destruction numbers of varying the amount of nitrogen added to the oxidized precursor activated carbon while keeping the total metal level at about 0.5 wt. % for Cu—N, Fe—N, and Cu—Fe—N.

Figure 8:
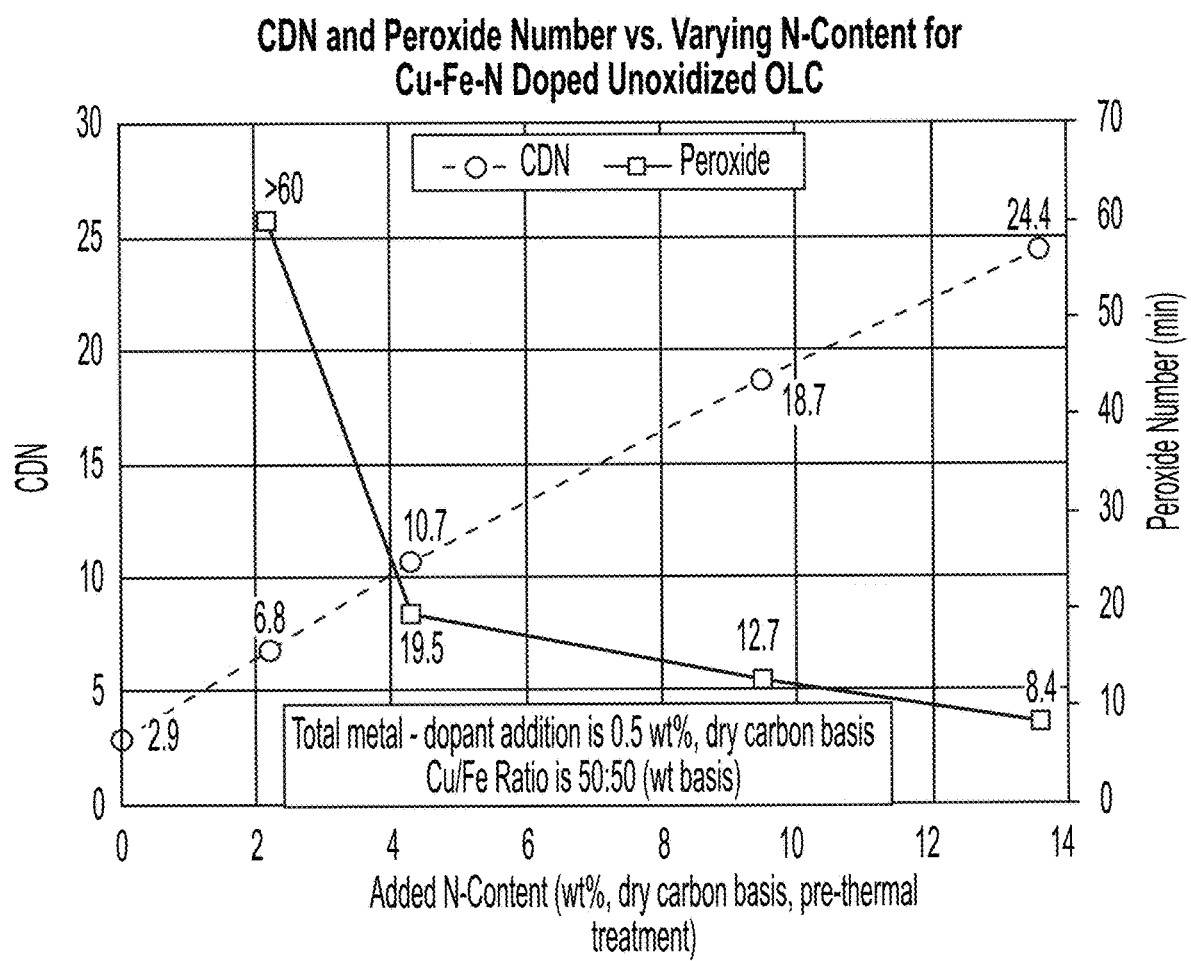
FIG. 8 depicts the CDN and peroxide number versus varying nitrogen content for Cu—Fe—N doped unoxidized OLC.

FIG. 8 shows the effect of varying the amount of nitrogen added to the unoxidized precursor activated carbon while maintaining the total metal level at about 0.5 wt. % on both CDN and peroxide destruction numbers for Cu, Fe, and N doped unoxidized precursor activated carbon formed from coconut carbonaceous material. FIG. 8 shows that, for a 0.5 wt. % total metals loading level, there is a linear increase in CDN as more nitrogen is added to the carbon. The peroxide destruction numbers also decrease as more nitrogen is added to the carbon.

Figure 9:
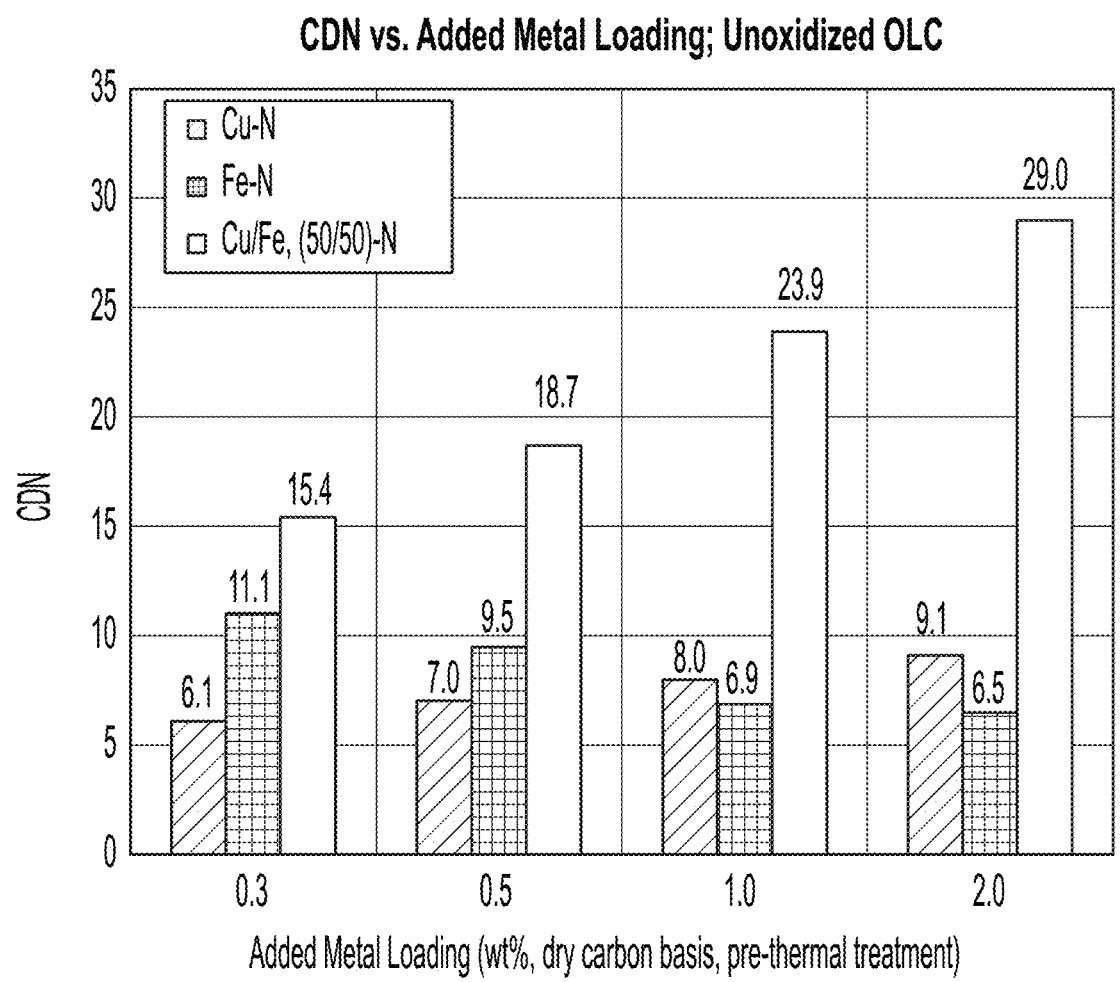
FIG. 9 depicts the CDN versus added metal loading with unoxidized OLC.
Figure 10:
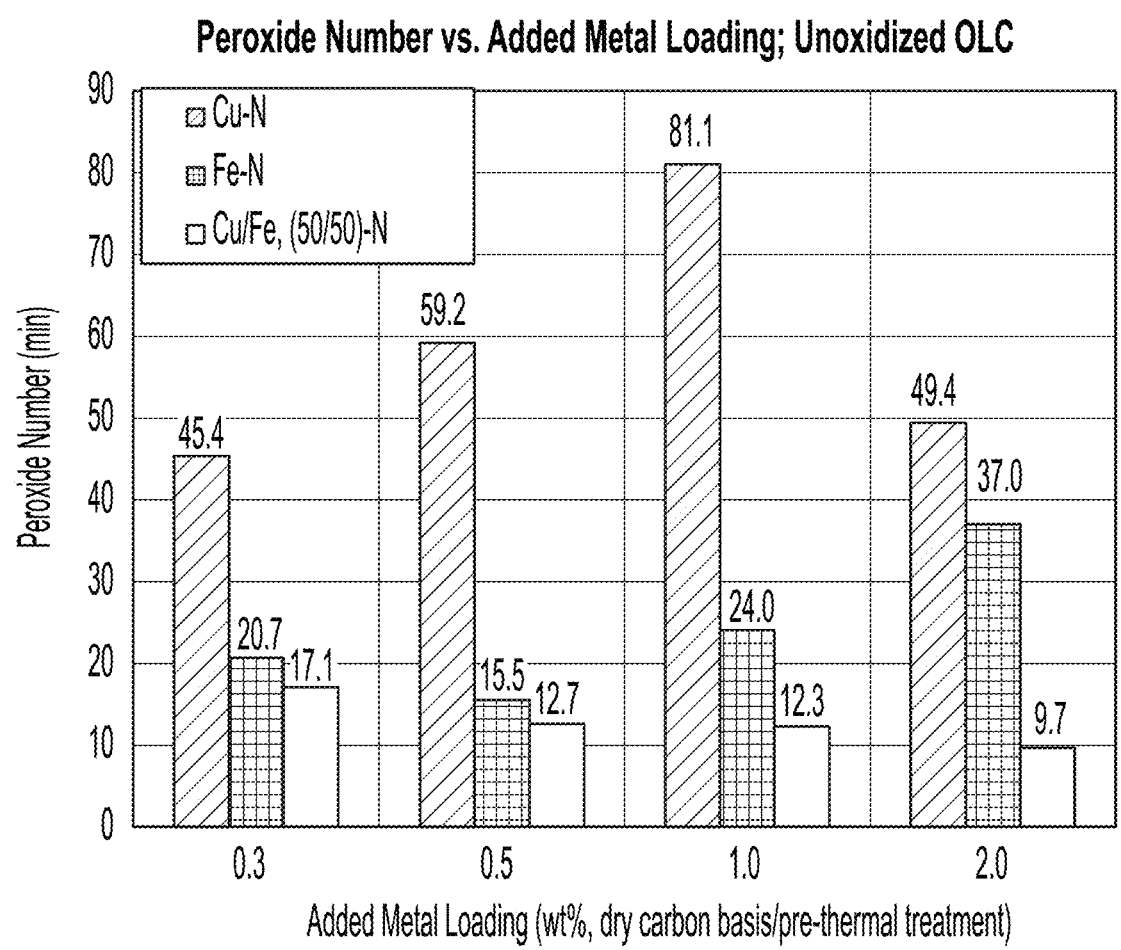
FIG. 10 depicts the peroxide number versus added metal loading with unoxidized OLC.

FIG. 9 and FIG. 10 show the effect of added metal loading to the carbon on both CDN and peroxide destruction numbers, respectively, for Cu, Fe, and N doped precursor activated carbon formed from coconut and that has not been oxidized. Doping such unoxidized precursor activated car- In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A sorbent material formed from a carbonaceous material that is activated to form a precursor activated carbon, the sorbent material comprising:
   about 4 wt. % to about 20 wt. % nitrogen as measured on a precursor activated carbon basis;
   about 0.1 wt. % to about 1 wt. % iron as measured on a precursor activated carbon basis; and
   about 0.1 wt. % to about 1 wt. % copper as measured on a precursor activated carbon basis;
   wherein the weight ratio of iron and copper is about 50:50;
   wherein the sorbent material has a chloramine destruction number (CDN) of about 5 to about 75, and
   wherein the sorbent material has a peroxide number of less than about 20 minutes.

2. The sorbent material of claim 1, wherein the chloramine destruction number is about 20 to about 75.

3. The sorbent material of claim 1, wherein the sorbent material has a peroxide number of less than about 15 minutes.

4. The sorbent material of claim 3, wherein the sorbent material has a peroxide number of about 1 minute to about 10 minutes.

5. The sorbent material of claim 1, wherein the amount of nitrogen is about 4 wt. % to about 10 wt. %.

6. The sorbent material of claim 1, wherein the amount of nitrogen is about 10 wt. % to about 20 wt. %.

7. The sorbent material of claim 1, wherein the sorbent material is formed from a carbonaceous material that is formed from one or more of coal, wood, and coconut.

8. The sorbent material of claim 7, wherein at least part of the carbonaceous material is formed from coconut.

9. A method of manufacturing the sorbent material of claim 1, the method comprising:
provided the carbonaceous material;
activating the carbonaceous material to form the precursor activated carbon;
optionally oxidizing the precursor activated carbon;
doping the precursor activated carbon by contacting the precursor activated carbon with one or more compounds that are a copper source, an iron source, and a nitrogen source to thereby form a doped precursor activated carbon;
calcining the doped precursor activated carbon by heating to a temperature of at least about 950° C. in a calcining atmosphere that does not cause any substantial oxidation or activation of the doped precursor activated carbon to thereby form the sorbent material of claim 1.

10. The method of claim 9, wherein a single compound is the copper source, the iron source, and the nitrogen source.

11. The method of claim 9, wherein a first compound is the copper source and the iron source, and a second compound is the nitrogen source.

12. The method of claim 9, wherein a first compound is the copper source and the nitrogen source, and a second compound is the iron source.

13. The method of claim 9, wherein a first compound is the iron source and the nitrogen source, and a second compound is the copper source.

14. The method of claim 9, wherein a first compound is the copper source, a second compound is the iron source, and a third compound is the nitrogen source.

15. The method of claim 9, wherein doping the precursor activated carbon is performed in a single stage process, the single stage process including contacting the precursor activated carbon in an aqueous solution that contains the copper source, the iron source, and the nitrogen source.

16. The method of claim 9, wherein:
the copper source is one or more of copper(II) sulfate pentahydrate ($CuSO_4 \cdot 5H_2O$), copper(II) chloride ($CuCl_2$), copper(II) chloride dihydrate ($CuCl_2 \cdot 2H_2O$), copper(II) nitrate ($Cu(NO_3)_2$), copper(II) nitrate monohydrate ($Cu(NO_3)_2 \cdot H_2O$), copper(II) nitrate sesquihydrate ($Cu(NO_3)_2 \cdot 1.5H_2O$), copper(II) nitrate hemipentahydrate ($Cu(NO_3)_2 \cdot 2.5H_2O$), copper(II) nitrate trihydrate ($Cu(NO_3)_2 \cdot 3H_2O$), copper(II) nitrate hexahydrate ($([Cu(H_2O)_6](NO_3)_2)$), copper(II) acetate ($Cu(CH_3COO)_2$), copper(II) acetate monohydrate ($Cu(CH_3COO)_2 \cdot H_2O$), Copper (II) formate tetrahydrate, $Cu(NH_3)_6^{+2}$, copper (II) carbonate hydroxide, ($Cu_2(OH)_2CO_3$) compounds thereof, or mixtures thereof;
the iron source is one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate (($NH_4)_3Fe(C_2O_4)_3 \cdot 3H_2O$), ammonium hexacyanoferrate(II) hydrate (($NH_4)_4[Fe(CN)_6] \cdot xH_2O$), ammonium iron(III) citrate (($NH_4)_5[Fe(C_6H_4O_7)_2]$), sodium ferrocyanide decahydrate ($Na_4Fe(CN)_6 \cdot 10H_2O$), sodium ferrioxalate ($Na_3Fe(C_2O_4)_3$), potassium ferrocyanide trihydrate ($K_4[Fe(CN)_6] \cdot 3H_2O$), potassium ferricyanide ($K_3[Fe(CN)_6]$), potassium ferrooxalate ($K_2[Fe(C_2O_4)_2]$), or iron(II) acetate tetrahydrate (($CH_3COO)_2Fe \cdot 4H_2O$), ferrous lactate dihydrate, ferrous lacate trihydrate, compounds thereof, or mixtures thereof; and
the nitrogen source is one or more compounds where nitrogen has a −3 oxidation state.

17. The method of claim 9, wherein the oxidizing is required and is performed.

18. The method of claim 9, wherein the oxidizing is not performed.

19. The method of claim 16, wherein the copper source is copper(II) sulfate pentahydrate copper(II) sulfate pentahydrate ($CuSO_4 \cdot 5H_2O$), the iron source is iron(III) chloride hexahydrate ($FeCl_3 \cdot 6H_2O$), and the nitrogen source is one or more of urea or dicyandiamide (DCD).

20. The method of claim 9, wherein calcining is performed at a temperature of about 950° C. to about 975° C. in a N2 atmosphere.

21. A method of removing chlorine, chloramine, or both chlorine and chloramine from a fluid with the sorbent material of claim 1, the method comprising providing the sorbent material and contacting the sorbent material with a fluid.

22. The method of claim 21, wherein the fluid is liquid water.

23. The method of claim 21, wherein the water or the sorbent material has previously undergone a disinfecting step.

* * * * *